United States Patent

Oxberry et al.

[15] 3,682,540
[45] Aug. 8, 1972

[54] PROJECTION OPTICAL PRINTING APPARATUS

[72] Inventors: John W. Oxberry, New Rochelle, N.Y.; Werner K. Bender, Carlisle, Mass.; Stanislaw A. Policht, Closter, N.J.

[73] Assignee: Berkey Photo Inc., New York, N.Y.

[22] Filed: March 10, 1969

[21] Appl. No.: 805,689

[52] U.S. Cl. .....................355/18, 352/90, 352/91, 355/39, 355/40, 355/46
[51] Int. Cl. .............................................G03b 27/46
[58] Field of Search..........................355/18, 39–43, 355/46; 352/90, 91

[56] References Cited

UNITED STATES PATENTS

| | | | |
|---|---|---|---|
| 2,153,212 | 4/1939 | Spray | 355/39 X |
| 2,622,475 | 12/1952 | Tondreau | 355/40 X |
| 2,964,995 | 12/1960 | Tondreau | 355/40 X |
| 3,040,619 | 6/1962 | Oxberry | 355/40 X |
| 3,480,362 | 11/1969 | Desjoux | 355/40 |

Primary Examiner—Samuel S. Matthews
Assistant Examiner—Richard A. Wintercorn
Attorney—Watson, Leavenworth and Kelton

[57] ABSTRACT

Projection optical printing apparatus which may be employed for variable enlargement and reduction of a projected image to which light sensitive material is exposed. The optical system of this apparatus comprises, in succession along the optical axis a light beam path, the following optical elements including an apertured support for a film print, e.g., a projector head film gate. This film print bears an image to be recorded with this support extending in a print plane transversely of and substantially normal to the optical axis with the latter extending substantially through the center of the support aperture. This film print support is followed by a printing lens substantially axially aligned with the optical axis, and, thereafter, a transversely extending support for light sensitive material, e.g., a camera film gate, through the center of which the optical axis extends and located at a plane of printing reproductions by the printing lens. Suitable mechanism is provided to translate along the optical axis one or more of these units, i.e., the light sensitive material support, the printing lens and the film print support relative to the others thereof. An improved light source sub-assembly is embodied in such apparatus at a position preceding the film print support or projector film gate. This light source sub-assembly includes a source of light rays to which the light sensitive material responds for recording thereon a replica of the projected image, and means providing in a transverse plane an in-focus image of the light source preceding the film print plane, such as that at the location of the source of light rays or thereafter as may be effected by focusing lens means in a focal plane at the second principal focus of the latter. This light source sub-assembly also includes a mechanically adjustable light valve in the light source image plane which embodies light-blocking and masking transverse means having opposed edges located at substantially equal distances on opposite sides of the optical axis to define an intervening light-passing space. The portions of this light valve means which have the opposed edges are simultaneously movable both directionally toward and away from the optical axis and in extent at equal increments of continuous motion for infinite variability of the intervening light-passing space.

For automatic adjustment of the opening of the light source valve a servomotor system may be provided advantageously which includes light valve control means automatically to adjust the opening in the latter in response to adjustment of the camera gate along the optical axis. A sophisticated version of this servomotor system for the printer which includes the pair of projector heads may embody a first output signal generator, such as a potentiometer, which is manipulated by adjustment of the camera gate along the optical axis, light valve opening adjustment mechanism, a second output signal generator, such as another potentiometer, manipulated by the light valve adjustment mechanism, and electrical circuit means connected to the output signal generators for combining the output signals thereof to produce a circuit output signal, with the means which automatically adjusts the opening of the light valve responding to the circuit output signal. A third output signal generator, such as still another potentiometer, is manipulated by the independently adjustable transfer lens between the projector heads and the output signal therefrom is combined in the circuit means with the other output signals to provide the circuit output signal which dictates the adjustment of the light valve opening.

18 Claims, 11 Drawing Figures

United States Patent
Oxberry et al.
[15] 3,682,540
[45] Aug. 8, 1972
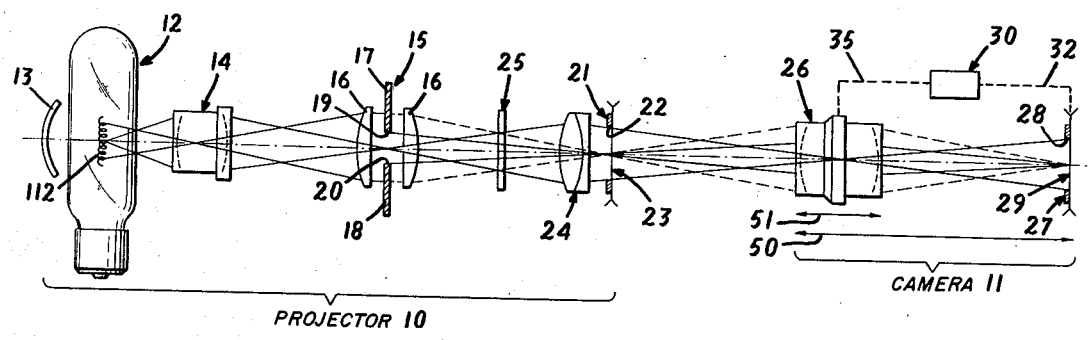
PROJECTOR 10   CAMERA 11

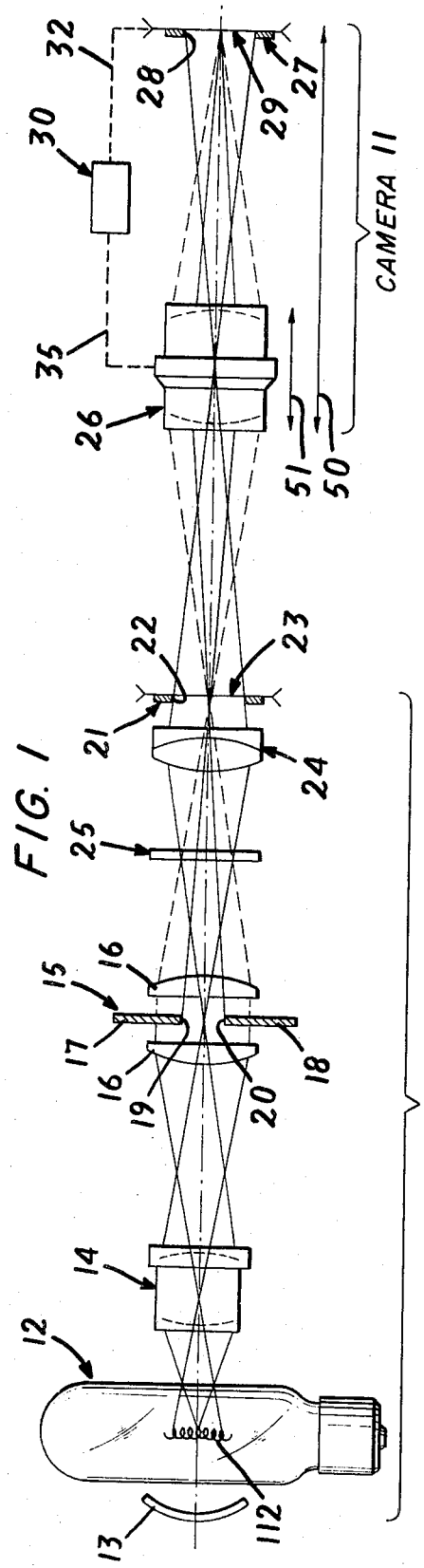
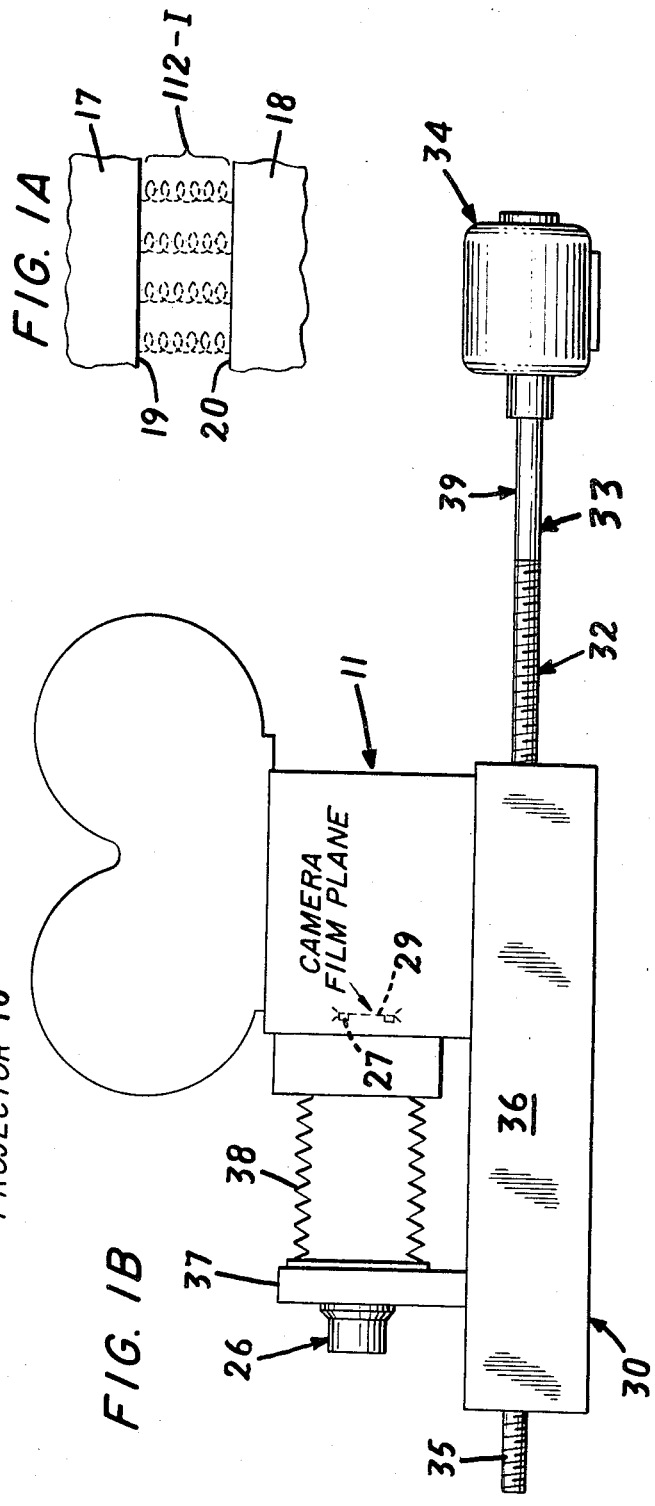

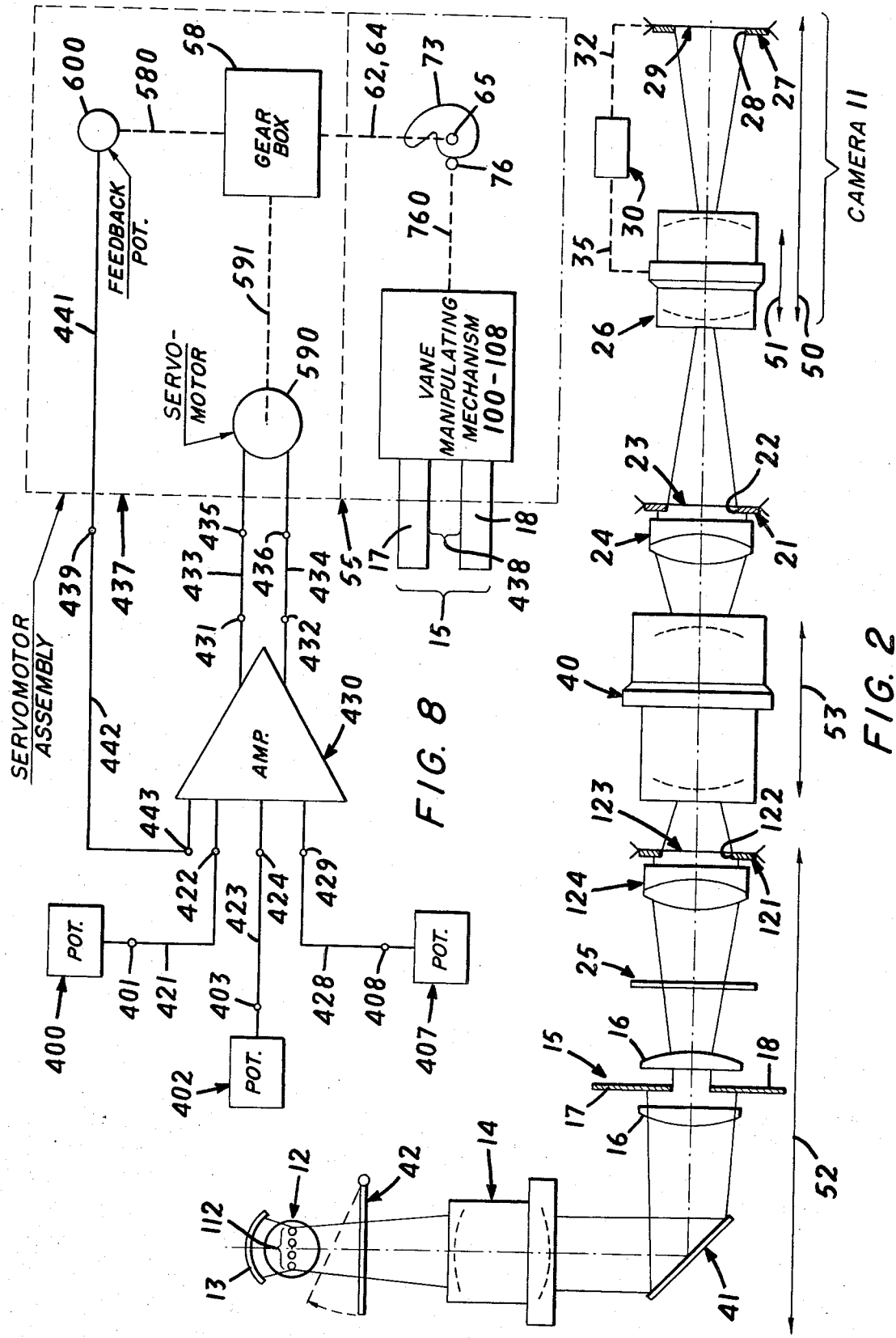

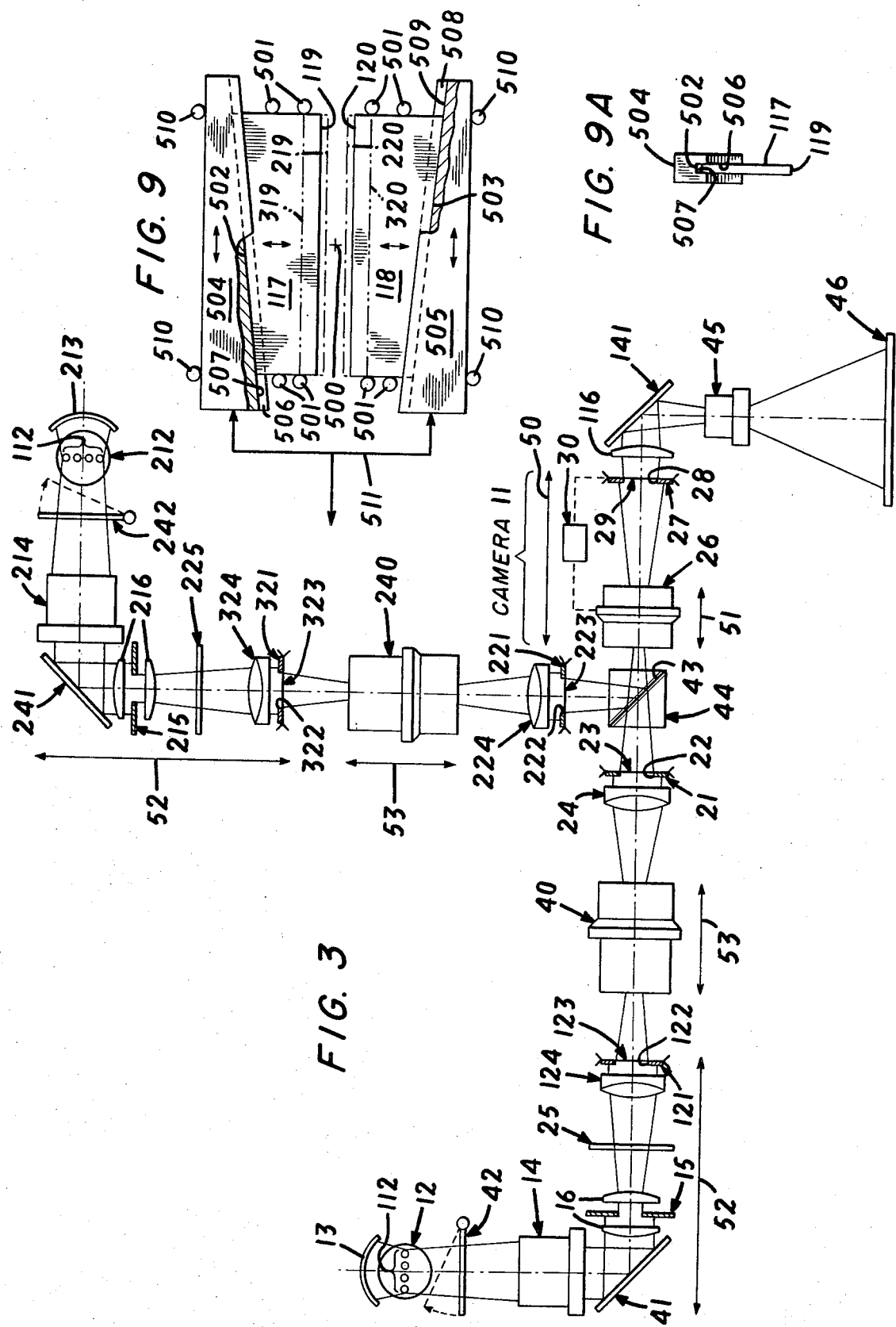

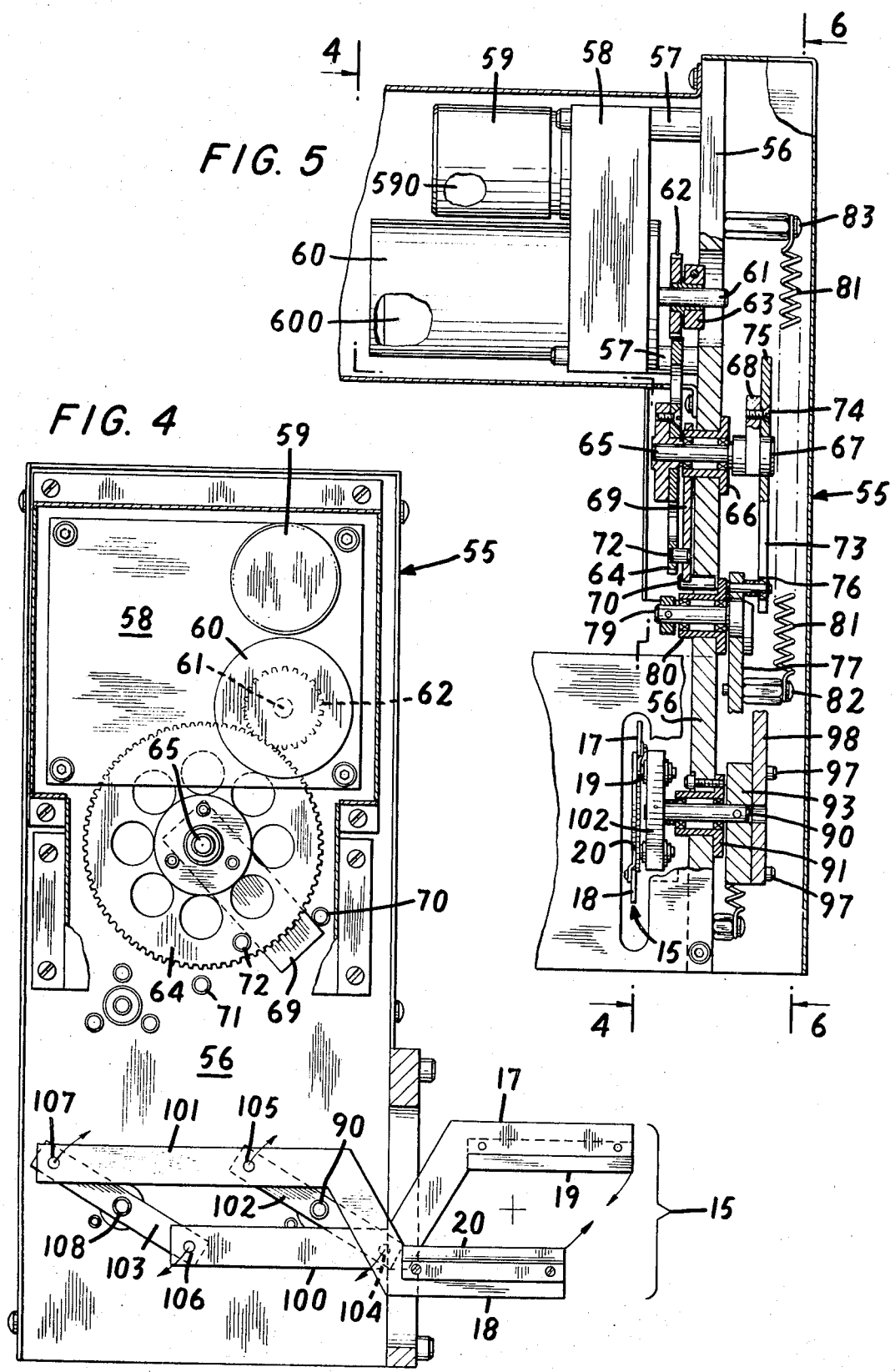

PROJECTION OPTICAL PRINTING APPARATUS

In optical printing techniques attained with the operation of projectional optical printing apparatus, such as a projection optical printer, obtainment and maintenance of a proper value of light intensity and even distribution thereof at a transversely extending support for light sensitive material in which a projected image is to be recorded, such as a camera gate having an opening in which a frame of a raw stock film is exposed, are desired optimums.

It is a common practice to provide prior optical systems of projection optical printers with a set of condensers just ahead of the lamphouse to collect the light rays delivered from the latter and pass them on along an optical axis in a compact bundle or beam successively to one or more projector gates, across the opening of each of which an image-bearing strip film is translated, a camera or printing lens, and a camera gate, to a raw stock film which is translated across the opening of the latter. Deliberate changes in the density of the light at the raw stock printing plane are demanded in the practice of projection printing techniques. If a film being translated through the projector head is darker in certain sections than skilled judgment dictates, a greater density of the printing light is demanded for printing these sections than is required for the lighter sections, and the attainment of desired contrasts make similar requirements. In operating prior projection optical printers light density adjustments have been of two types, i.e., (1) to adjust the opening of an iris diaphragm in the printing lens assembly, (2) to vary the voltage imposed upon the electrical light source bulb, (3) to employ a neutral density filter, (4) variable camera shutter, and (5) adjustment of the exposure time.

Adjusting the opening of an iris diaphragm in the printing lens assembly poses many undesirable problems. Such adjustments are recognized as $f$ stop changes. There are 12 points or units in a single $f$ stop, and one point is expressed by the formula 0.025 Log. E where E indicates the illumination in recognized arbitrary units. In passing light rays through the iris opening those which strike the edges of the iris blades and pass through are deviated slightly. Consequently, the focal length of the printing lens is changed thereby, which causes a change in the size of the image at the camera gate. If the camera is zoomed in for progressive blowup or zoomed out for retrogressive reduction this image size change is progressive. Zoom changes in focus due to $f$ stop changes resulting from iris adjustments for light compensation require laborious and time consuming operator manipulations, and demand extreme skill. For such reason, and others, the zooming of the camera of such simplified optical printing system characterized by a single projector head is quite consistently avoided, especially when matte work is practiced.

In the use of a printing optical system which involves the use of a plurality of projector heads, including one or more aerial image projector heads for translation of one or more mattes therethrough, such as that proposed in the Oxberry U.S. Pat. No. 3,040,619 of June 26, 1962, the problems developed by adjustment of the iris diaphragm in the printing lens assembly become more complicated. This is equally true with respect to a plural projector head optical system wherein the projecting section of this Oxberry patent printing system additionally is embodied in a secondary duplicate of the primary projecting section, whereby these primary and secondary projecting sections additively impose their combined outputs on the raw stock film being printed in the single camera. This secondary projecting section, as in primary projecting section employed in the Oxberry patent system, includes, in succession, its own source of light rays, an aerial image projector head, an axially adjustable transfer lens and a relatively fixed master projector head having an associated field lens, and it may be embodied with the primary projecting section by inserting an oblique light transmitting and reflective mirror, e.g., a beam splitter, between the gate of the master projector head of the primary projecting section and the printing lens. The output of this secondary projecting section is directed toward the oblique reflecting interface of the beam splitter for combining thereat its transmitted image with that transmitted by the Oxberry patent primary projecting section for projection of the combined images to the camera raw stock film. The black core matte film, having an opaqued area of a desired or wanted foreground image surrounded by an image-free transparent field, may be translated through the aerial image projector head of the primary projecting section, and the film bearing the complete background image may be translated through the master projector head of this section. The white core matte film, having an image-free transparent area of the wanted foreground image surrounded by an opaque ground or field, may be translated through the aerial image projector head of the additive secondary projecting section, and the film bearing the wanted foreground image surrounded by an unwanted image of the studio setting (the latter of which is to be eliminated by the surrounding opaque field of the white core matte) may be translated through the master projector head of this secondary projecting section. The outlines of the wanted foreground image and of the white core and black core areas of the mattes which correspond to this foreground image must be matched to within about twenty millionths of an inch (0.00002 inch) of each other, i.e., of the order of light wavelengths, and this exactitude of matching must be maintained during in and out zoom shots, in order to avoid undesirable features in printed films of the assembled background and foreground images. A skilled operator attains such matching by the observation of showings of color to guide adjustments.

Operation of prior printing systems of such projection optical printers do not maintain such a degree of matching during zooms because of the need in the progress of the latter of repeated changing of the $f$ stop of the iris diaphragm in the printing lens is a ready manner of identifying the total angular photographic field produced thereby it is apparent that the lens focal length changes resulting from $f$ stop alterations effect changes of the total angular photographic field. This results from the attendant change in the angle of incidence of the marginal light rays of the beam passed through the changing size of the opening in the iris diaphragm. In the practice of full color printing with such prior printing systems employing a 1:1 ratio printing lens if the outlines of the black matte core are precisely matched with the margins of the foreground image insert at a certain f stop, in progressing through a reduction of image size, the f stop opening is progressively reduced to cause development of an undesirable black halo about the margins of the foreground image insert in the printed camera film as a result of the black core area image being too large. Also, out of focus condition is progressively developed and even intensity of the photographic field deteriorates, such as to produce mottled density of this field. In full color printing, if the black core area image becomes too small in the zooming and the attendant f stop adjustment the printed foreground image insert will have developed around its margins a light halo due to the mismatch of mattes. In very precise matte operation production of full color films some prior producers thereof have resorted to the costly and tedious practice of using stop motion photography for frequent checking of the effective sizes of matte core areas and resizing thereof as demanded, while zooming progresses.

An ideal way of overcoming this problem, particularly in full color production, is to vary the light intensity in some manner other than by constant change of the f stop of the printing lens, but this should be done in a manner to avoid altering the color temperature of the light source. For this purpose, some skilled in the art have resorted to the use of a complicated filtering system embodying a variable density "neutral density" disk. However, the making of such a variable neutral density filter disk in a suitable, precisely balanced form is very complicated and quite costly, and its operation in an effective manner demands unusually high skill.

Controlling and varying the light intensity by adjustment of the voltage of the electrical power supplied to a source of light rays, such as that which energizes the filaments of incandescent lamp or lamps when employed as this source, imposes color change on its output. The higher this voltage is the bluer the output beam becomes, and the lower the value to which this voltage is adjusted and redder is the production, but may be satisfactory for monochrome work, even through it is complicated and time consuming to attain with the precision required.

The use of neutral density filters to effect adjustments of the light intensity is undesirable since they are inaccurate, difficult to produce in fine enough steps of light intensity adjustment, very expensive to produce and undesirably cumbersome.

When variable camera shutters are employed to adjust the light intensity you inhibit the intent of its use for fades and dissolves.

Increasing the exposure time to increase the amount of light imposed upon the light sensitive material for recording a projected image, such as a frame of the raw stock film, undesirably reduces the production or amount of footage output.

The present invention solves these problems of prior art practices in an unusual and economical manner which permits ready attainment of optimum performances, and the automatic version thereof, hereinafter taught and claimed, assures simple and rapid attainment of the desired results.

In the broadest aspect of the present invention projection optical printing apparatus is provided which may be employed for variable enlargement and reduction of a projected image to which light sensitive material is exposed. Such apparatus may be in the form of any of a variety of types of projection optical printers or in other apparatus employing similar optical principles such as, for example, those commonly termed "enlargers." The optical system of any such apparatus comprises, in succession along the optical axis a light beam path, an apertured support for a film print that bears an image to be recorded with this support extending in a print plane transversely of and substantially normal to the optical axis with the latter extending substantially through the center of the support aperture, a printing lens substantially axially aligned with the optical axis, and a transversely extending support for light sensitive material through the center of which the optical axis extends and located at a plane of printing reproductions by the printing lens. It may embody suitable mechanism to translate along the optical axis one or more of these units, i.e., the light sensitive material support, the printing lens and the film print support relative to the others thereof. An improved light source sub-assembly is embodied in such apparatus at a position preceding the film print support. This light source sub-assembly includes a source of light rays to which the light sensitive material responds for recording thereon a replica of the projected image, and means providing in a transverse plane an in-focus image of the light source preceding the film print plane, such as that at the location of the source of light rays or thereafter as may be effected by focusing lens means in a focal plane at the second principal focus of the latter. This light source sub-assembly also includes a mechanically adjustable light valve in the light source image plane which embodies light-blocking and masking transverse means having opposed edges located at substantially equal distances on opposite sides of the optical axis to define an intervening light-passing space. The portions of this light valve means which have the opposed edges are simultaneously movable both directionally toward and away from the optical axis and in extent at equal increments of continuous motion for infinite variability of the intervening light-passing space.

An aspect of the improvement provided by the present invention involves in a projection optical printer version thereof elimination of these prior practices, so as to avoid the remarked problems attendant upon the practice of such adjustments. This is accomplished preferably by providing as the light source a sub-assembly which includes source of light rays, e.g., the lamp or lamps in a lamphouse, a condenser or transfer lens assembly having its first principal focus located at the light rays source, such as the lamp filament or filaments, and a determined focal length to a second principal focus thereof, and an adjustable light valve which is located in the remote transverse focal plane at the second principal focus of this condenser, all axially aligned and fixed relative to each other along the optical path.

This adjustable light valve preferably is in the form of a pair of light-blocking and masking vanes or blades having opposed, spaced apart edges located at substantially equal distances to opposite sides of a zero reference point, i.e., the optical axis. Mechanism is provided for moving these light valve vanes simultaneously in opposite directions in the remote focal plane toward and away from the optical axis. The simultaneous motion of the opposed edges of these blades is in equal increments of continuous motion for progressive approach toward and retrogressive retraction away from each other with substantial maintenance of the equality of their spacings to opposite sides of the optical axis for adjusting with infinite variation the intervening space to effect the required change in the quantity of light passes therethrough with maintenance of substantial equal distribution of the light along this space. For practical service this adjustable light valve should be closely flanked on at least one side thereof by a field lens or collector, and preferably a pair of the latter closely flank opposite sides thereof for arbitrary balance. While one or more lamps equipped with filament means that are rendered incandescent by electrical energization may be preferred as the source of light rays it is to be understood that other types of such sources may be used in the new light source sub-assembly, such as fluorescent tubes and other glowing gas devices. This unique light source sub-assembly projects an image of the energized source of the light rays to the remote focal plane. There is thus provided in this focal plane an in-focus image of the unmasked portions of the source of the light rays, e.g., the incandescent filaments, within the space intervening the opposed edges of these vanes. As a result, the intensity of the light is adjusted by the degree of the spacing between the opposed edges of the light valve vanes.

This improved light source sub-assembly is useful to great advantage in even the simplest form of projection optical printers which includes, in succession along the axis of the optical light beam path thereof and following such light source sub-assembly, a transversely arranged projector head gate through the center of the aperture of which the optical axis extends with a suitable field collector lens means immediately preceding this gate; a printing lens; and a transversely arranged camera gate having a printing aperture to the center of which the optical axis extends. Such simple printer also conventionally embodies film advancing means, e.g., intermittents of the fixed pin registration type, respectively associated with the projector gate and the camera gate to guide and effect the translation of an image-bearing film strip past the former and the translation of a raw stock film strip past the latter, whereby successive frames of the raw stock film strip will be printed with the images borne in the successive frames of image-bearing film strip.

By virtue of the use of this new light source sub-assembly in such a simple form of printer zoom shots may be embodied successfully in sections of the printed raw stock film strip. As is conventional, the printing lens and the camera gate, i.e., the camera framework which carries this gate, are translatable along the optical axis with the axial translation by suitable follow-focus means of the camera and its gate being correlated to but differing from the axial translation of this printing lens. For example, in accordance with prior art practice, on zooming in for blow up of printed images from a 1:1 ratio of the sizes of the projected images and the printed images to gradually increasing enlargement of the latter of, e.g., 1:3 the camera and its gate are backed off progressively while the printing lens is advanced progressively toward the projector gate; and on zooming out for gradual reduction of the sizes of the printed images to, e.g., 4:1, the printing lens and camera gate are both backed away with the lens progressively approaching the raw stock at the camera gate. A full color production with the use of this simple form of printer (that is equipped with the present improved light source sub-assembly), involving zoom shots, is free of undesirable color changes, and no $f$ stop adjustments of an iris diaphragm during the printing are required, since the desired alteration in the light intensity is effected by the present light valve that is located remotely from the lamphouse. On zooming in for gradual blow up of the images being printed this light valve is gradually opened up for progressively increasing the intensity of the light at the camera gate opening; and on zooming out for gradual reduction of the sizes of the images being printed a progressively lesser quantity of light in the camera gate opening is required, and thus the opening in this light valve is gradually made narrower for this latter operation.

The performance of projection optical printers which embody a plurality of projection heads, including one or more aerial image projector heads, are likewise greatly improved by embodiment therein of the present adjustable light source sub-assembly. Such improved performance may be concerned with the operation thereof that relies on the use of black core and white core strip film mattes in assembling foreground images with background images of strip film prints, and the incorporation thereof in the negative strip film being printed of sections embodying zoom shots. For this purpose the optical printer may embody a pair of projecting sections, and a single camera gate which is translatable along the optical axis for zoom shots and with which is associated a single such axially adjustable printing lens having its axial translation correlated to the camera gate translation for such purpose. One of these projecting sections is a primary projecting section that includes the new light source sub-assembly, i.e., the source of light rays or lamphouse, the imaging transfer condenser and the new adjustable light valve at the remote focal plane of the latter; an aerial image projector having its gate immediately preceded by a field collector lens means in an axially fixed position relative to this gate; common means to support this new light source, the achromat and the aerial image projector head in fixed positions relative to each other along the optical axis, but to effect adjustment thereof together along the latter as a unitary assembly; a master projector head fixed at a point along the optical axis and having its gate immediately preceded by another field collector lens means in an axially fixed position relative to this latter gate; and an axially and independently adjustable imaging transfer lens inserted between these aerial image and master projector heads for independent axial translation of this transfer lens relative to this pair of projector heads. The other of this pair of projecting sections constitutes a secondary projecting section that is functionally similar to the primary projecting section and comprises similar optical elements and associated supports and adjusting mechanisms from the standpoint of purpose. This secondary projecting section has its optical axis directed toward and intercepted by the reflective face of an oblique light transmitting and reflective mirror means that is interposed between the master projector head gate of the primary projecting secton and the camera printing lens with the optical axis of this primary section passing substantially centrally through this mirror means. It is preferred that the optical axes of this pair of projecting sections be arranged substantially normal to each other, i.e., at about 90° with respect to each other. Each of the field collector lens means may be an achromat of suitable design.

The black core matte is translated transversely past the aerial image projector gate of the primary projecting section, the background image bearing film is translated transversely past the master projector gate of this primary section, the white core matte is translated transversely past the aerial image projector gate of the secondary projecting section, and the foreground image bearing film is translated past the master projector gate of this secondary section. Of course, the margins of the foreground images which are to be inserted without overlap or marginal gaps within the images of the background images upon the raw stock film being translated transversely past the camera gate during the printing operation, and of the black core and white core areas of the mattes which duplicate in size and shape those of the insert images will be carefully matched initially to the latter by previously known or conventional techniques of preparing such mattes.

The adjustments of the spacing between the opposed edges of the vanes of the adjustable light valves embodied in the light source sub-assemblies of the pair of primary and secondary projecting sections is intended to and effectively will alter the effective intensities of the light outputs of the lamps in the respective light source sub-assemblies within the limits of the demands for which the printer optical system is designed, in lieu of adjusting an iris diaphragm in the printing lens assembly for this purpose. The effective sizes of the black core and white core simulations of the foreground inserts in relation to those of the latter are readily maintained even during blowup and reduction zoom shots within the extremely small limit of variations permitted for attainment of optimum results. The employment of the new light valves and the light source sub-assemblies embodying them assures that, once the mattes have been correctly matched to each other and to the foreground image inserts, the critical matching will be maintained regardless of whether or not a camera zoom is imposed.

Apart from the great advantage attained by the use of the improved adjustable light source sub-assembly of the present invention (which includes the present adjustable light valve remote from the source of the light rays) in a plural projection head optical printer in the assembling of a plurality of images, such as foreground and background images, in the frames of the raw stock film being printed with the use of properly sized black core and white core mattes, is the further advantage of assuring reliable attainment of a more subtle capability of accuracy and of repeatability of the desired results. In printing operations performed by a highly skilled operator with the use of prior projection optical printers in which required changes of light intensity are attained by adjustment of the iris diaphragm in the printing lens he usually can do no better than attain a degree of accuracy of about one-eight of an $f$ stop even with the exercise of the greatest of care. By comparison, when he performs a similar printing operation with the use of a projection optical printer of the present invention he can attain with assured reliability a degree of accuracy of about one-twenty-fourth to one-thirtieth (1/24 to 1/30) of an $f$ stop, which is considerably greater than the presently accepted maximum degree of accuracy of one-twelfth (1/12) of an $f$ stop.

Since the effective light intensities or the outputs of the lamphouses are controlled by the new light valves of the present invention the outputs of the lamps readily can be maintained at the correct color temperatures and the printing lens can be constantly maintained at its best $f$ stop, to allow production of full zooms with no deleterious changes in image sizes.

As to the essential maintenance of balance or matching of the color temperatures of the lamps in a printer employing a plurality of projecting sections, and thus a plurality of light sources, it must be realized that lamp manufacturers are incapable of maintaining in an economical manner production control which will assure the same color temperature for a plurality of the lamps that they produce. Further, as the life of use of a lamp progresses color temperature change thereof occurs. This balance is maintained in plural projecting sections versions of the projection optical printers of the present invention by associating advantageously with the light output opening of each source of light rays, e.g., lamphouse, a swingable dichroic color correcting filter preceding the imaging or light transfer condenser of this new light source sub-assembly. Change of the angle of incidence of such swingable filter with respect to the optical path of the output beam will permit such color correction as will assure identical performances of the lamphouse light sources.

It is also desirable to remove from the optical system the heat rays emanating from the light source beam at a point in the light source sub-assembly, preceding the light valve and its one or more flanking field lenses. This is efficiently accomplished by interposing between the imaging transfer condenser and the field lens which flanks the approach side of the light valve, or the latter if a single flanking field lens is employed on the exit side of the light valve, a dichroic mirror arranged obliquely to the optical axis extending therebeyond successively through the light valve and the succeeding projector head. This dichroic mirror will turn the light path through an angle, e.g., about 90°. This will perform two desirable functions, i.e., (1) to pass therethrough out of the optical system undesirable heat rays, and (2) to turn the optical axis through an angle of less than 180° which places to one side the source of light rays or lamphouse and, if desired, the operative mechanism associated with the light valve to manipulate the vanes thereof for adjusting the intervening space between the opposed edges of the light valve vanes. As a result of the second function the over-all length of the printer may be desirably shortened and the elements of the system preceding this oblique dichroic mirror, may be offset to one side so as to make the printer structure more compact and to move the offset structure and elements to one side out of the way.

It may be further desirable to mount in the projecting section of either the simple single projection head version of the printer at a point preceding the field collector lens means or achromat associated with the latter, or in the version embodying a plurality of projector heads including an aerial image projector head immediately preceding the field collector lens or achromat associated with the latter, a transversely arranged diffuser in the form of a plano translucent sheet having a finely ground surface. In such printer embodiments such diffuser is thus located beyond the light source sub-assembly or the improved light valve of the present invention and its one or more flanking field lenses. Such diffuser will desirably break up the light rays between the image of the energized source of light rays or incandescent lamp filaments transmitted to the remote focal plane in which the light valve vanes are arranged and the field collector lens means or achromat located therebeyond, so as to assure in the light beam a rather uniform density of field of illumination.

The means for manipulating both of the opposed light valve vanes of the improved light valve which is embodied in the light source sub-assembly may be provided in a variety of forms. In any case, the opposed edges of the light valve vanes are to be moved simultaneously in continuous motion either toward or away from each other. This is particularly advantageous when an automatic system is provided to effect such adjustment in response to signals developed by translation of the camera gate along the optical axis, translation of the transfer lens along the optical axis when it is interposed between an aerial image projector head and a relatively fixed projector head in a projecting section of a plural projector head version of the printer, and an operator adjustable device or manual controller which creates a third signal. The means which moves one or more of the light valve vanes relative to the other for adjusting the intervening light passing space therebetween may comprise a driven rotary cam structure provided with a contoured circumambient track (which may extend through more than 180°) and follower means urged to continuous contact of the latter. The means to rotate this cam is such that it will rotatably translate its track in a manner whereby the advancing point of contact thereof by the follower means progresses linearly in radial degrees, in order to obtain a square output from the cam and its follower means, and manipulating mechanism connecting the latter to the light valve vanes for manipulating them.

For the latter purpose the light valve may include a symmetrical parallelogram mechanism which comprises a pair of opposed and substantially parallel side bar members and substantially parallel end bar members that are spaced apart in the direction of the longitudinal dimension of the side bar members and which are pivotally connected at longitudinally spaced points to the latter. As a result, rotation of one of these end bar members of the parallelogram mechanism by the cam follower means in one direction causes the side bar members progressively to approach each other, and when this end member is rotated in the opposite direction it causes them retrogressively to retract from each other. The side bar members of the parallelogram mechanism respectively carry one of the light valve vanes so as to effect simultaneous motion of the pair of the latter for advancing and retracting their opposed edges toward and away from each other.

Such light valve manipulating mechanism and the system in which it is embodied may include to advantage an operator-adjustable selector light control or manual controller for imposing on this system a signal for accommodating situations where the light changes for any given enlargement or blowup and for any given reduction exceed the potential of the light valves. For example, the maximum light required for a certain operation may be greater than that available when the light valve in the concerned projecting section is wide open. In such case the light valve is closed down partially by the selector light control and the camera shutter speed is decreased until the net result of the quantity of the illumination at the printing aperture or camera gate opening is equivalent to that required for this particular operation. It may also provide other advantageous services.

The automatic control of the adjustment of the improved light valve of the present invention includes position control means which are operatively connected to the axially translatable printing lens and camera gate on one hand and to the movable light valve vanes on the other hand. As a result, the vanes automatically are moved proportionally with respect to the axial translation of the printing lens and camera. For this purpose there may be coupled to the mechanism for axially translating the printing lens and camera gate in correlated manner, e.g., the drive of follow-focus mechanism, a signal generator, e.g., a potentiometer, which is continuously manipulated automatically by and in pace with the operation of such mechanical drive. This manipulation of the potentiometer causes the latter to develop and deliver an output signal that is proportional to the printing lens and camera gate axial translation and is supplied by suitable control circuitry or circuit means to a servomotor which in turn, through suitable drive mechanism, such as gearing and cam means and vane manipulating mechanism, physically adjusts the light vanes relative to each other. Desirably, the servomotor output drive is suitably coupled to another signal generator or potentiometer to develop and deliver another output signal which is proportional to the mechanically driven vane motion. These two signals are supplied in opposition to each other to an electrical combining or summing means in the control circuitry which may be a suitable amplifier with an input network adapted to perform this function, so as to produce a resultant circuit output signal to which the servomotor responds for controlled operation of the drive mechanism that manipulates the light valve vanes to adjust the width of the light-passing slot between the latter. In order to permit the person who is operating the printer to adjust the range of the opening of the light valve which is then to respond to automatic control, i.e., the light-passing space between the opposed edges of the pair of vanes thereof, there is also provided the previously indicated manual controller or selector light control that is coupled to a third signal generator or potentiometer for manual manipulation to develop and deliver still another output signal that is proportional to the controller setting. This third output signal is combined or summed in the control circuitry with the other two output signals to produce the resultant circuit output signal that controls the drive of servomotor. All of these transducer elements may be embodied in the automatic control means connected between the camera translating drive mechanism and the light valve vane adjusting mechanism as the interposed control means.

When such an automatic control system is embodied in a plural projector head projection optical printer with one projecting section thereof comprising, in succession along its optical axis, the improved light source sub-assembly, an aerial image projector head with its field collector lens means or achromat immediately preceding the gate of the latter, an imaging transfer lens, and a relatively fixed master projector head, the light source sub-assembly and the aerial image projector head with its immediately preceding field collector lens means or achromat may be advantageously supported by common means which is translatable as an assembly unit along the optical axis. This latter axial translation feature requires that the imaging transfer lens which is interposed between the gates of the aerial image and master projector heads be independently supported and translatable along the optical axis to keep in focus at the master projector gate images that are projected from the axially translatable aerial image projector gate. Accordingly, when the automatic control system is embodied in such a printer a fourth signal generator or potentiometer must be coupled to this imaging transfer lens so that the output signal from this generator is supplied to the summing network of the combining circuitry to create the resultant circuit output signal that controls the drive of the servomotor.

The objects of the present invention which have been made apparent from the preceding discussion of the problems entailed by prior art printing procedures and the known printers to perform them, as well as the therefollowing resume of the constructions and desirable operations of the various embodiments of the present projection optical printer, are supplemented by other objects which will in part appear from reference to the following detailed description taken in connection with the accompanying drawings, wherein like numerals identify similar parts throughout, and in which:

FIG. 1 is a diagrammatic view of the optical system of an embodiment of a projection optical printer of the present invention in simple form which includes a single projector head and the improved light source sub-assembly thereof;

FIG. 1A is an elevational view of the exit side of the vanes of the light valve embodied in the light source sub-assembly of FIG. 1, with parts broken away, illustrating the image of the energized light rays source intervening the separated edges of the vanes thereof;

Figure 6:
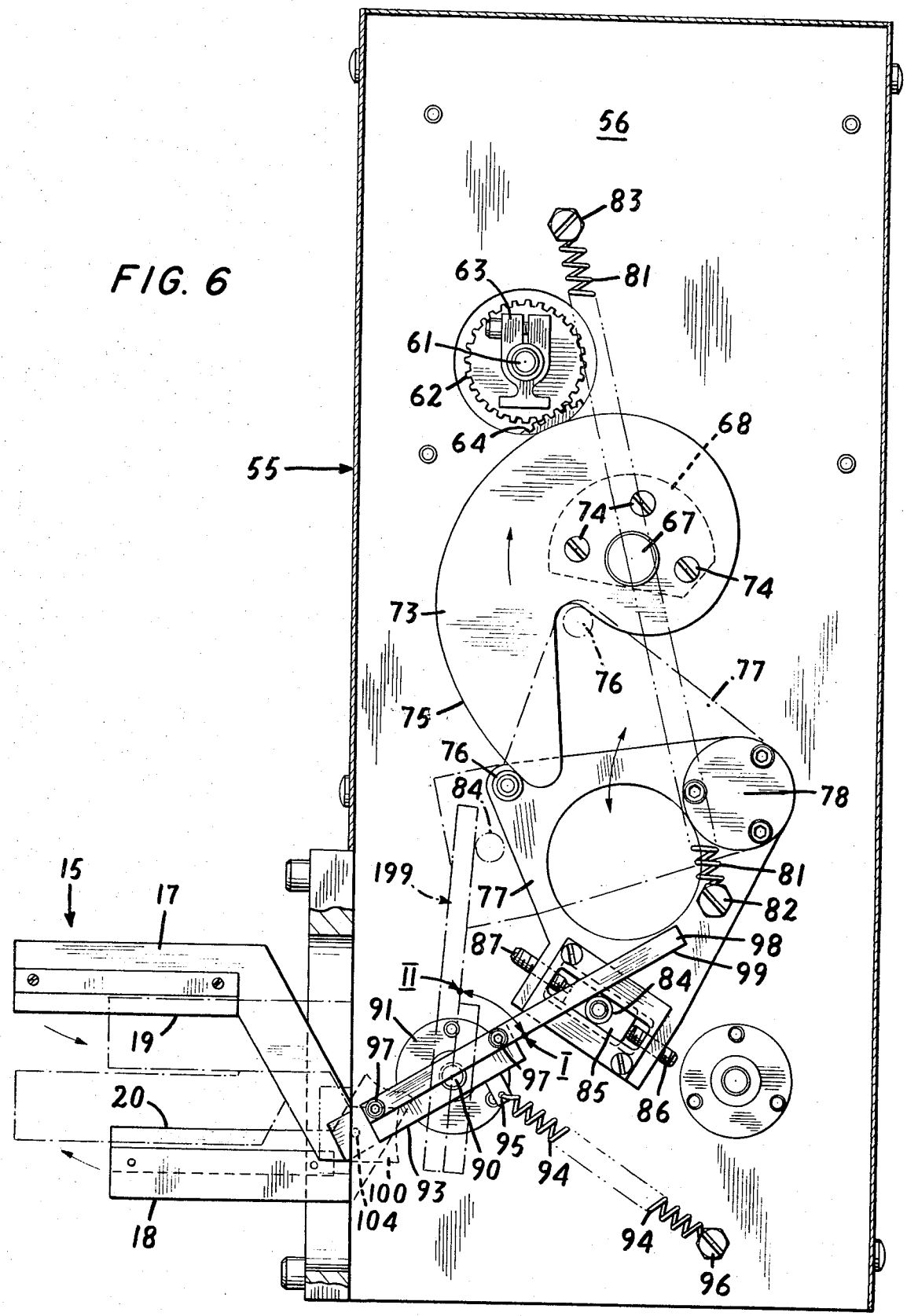
Figure 7:
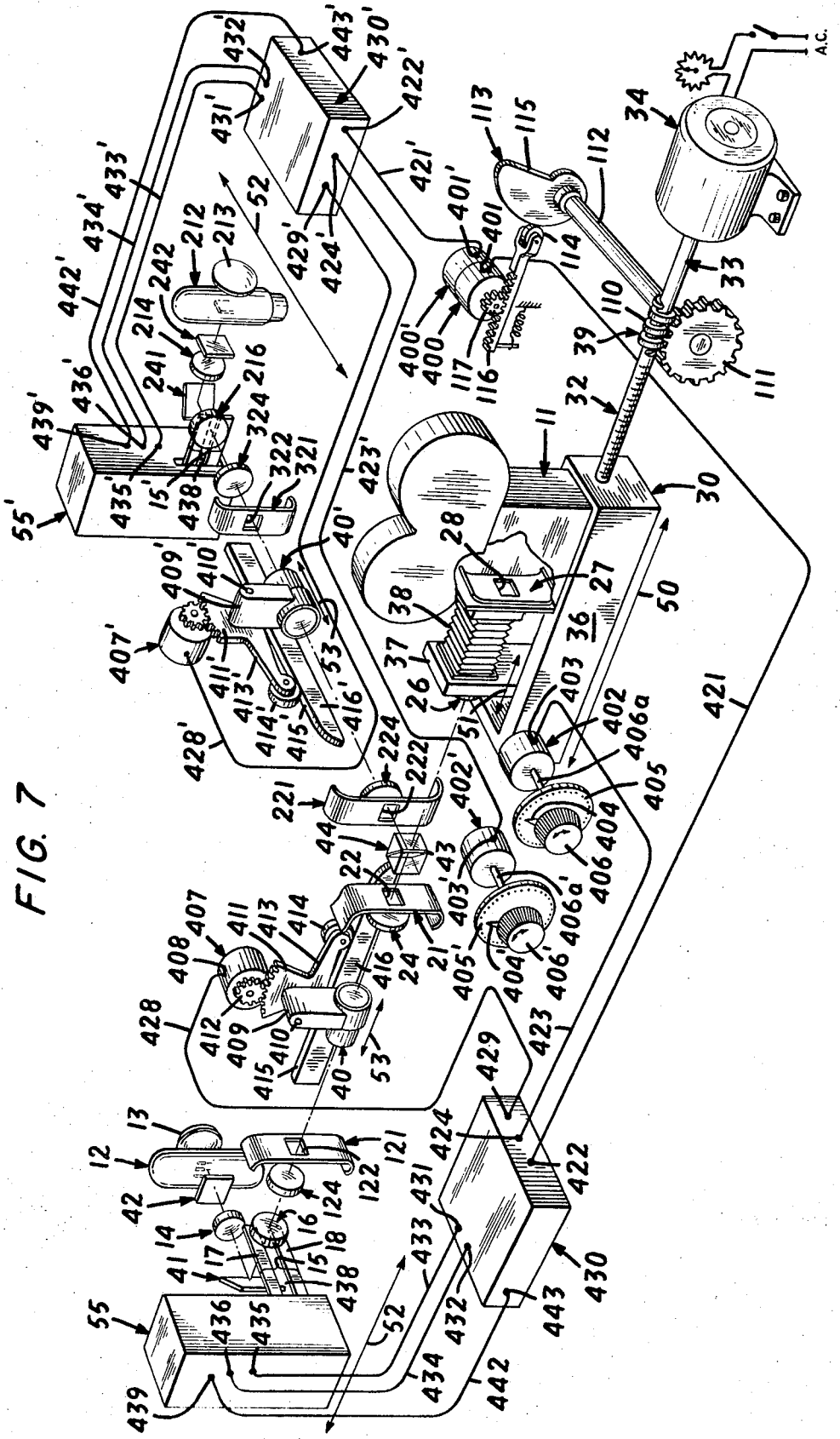

FIG. 1B is an enlarged side elevational view, with parts broken away, of a camera structure and the camera or printing lens which is associated therewith, as well as of a suitable mechanism for translating the printing lens along the optical axis of the printer and conventional encased follow-focus mechanism for translating the camera and its gate along the optical axis in correlation to the translation of the printing lens;

FIG. 2 is a diagrammatic view similar to FIG. 1 of the optical system of another embodiment of the projection optical printer which has incorporated therein the improved light source sub-assembly of the present invention and other desirable features thereof, this embodiment being characterized by a pair of projector heads and their associated gates with one constituting an aerial image projector head and the other constituting the master projector head;

FIG. 3 is a diagrammatic view similar to FIGS. 1 and 2 of the optical system of still another embodiment of the projection optical printer which includes the projecting section of FIG. 2 as a primary projecting section and a similar projecting section as a secondary projecting section which is incorporated in the optical system by an oblique light transmitting and reflective mirror means interposed between and optically aligned with the primary projecting system and the printing lens;

FIG. 4 is an enlarged elevational view, with parts broken away and in section, of mechanism of the improved light valve which may be embodied to advantage in the printers and optical systems thereof that are illustrated in FIGS. 1 to 3 incl.;

FIG. 5 is another side elevational view, with parts broken away and in section, of the structure shown in FIG. 4 and as viewed from a position at 90° to the plane of observation of the structure shown in FIG. 4;

FIG. 6 is a further enlarged sectional view, with parts in elevation, taken substantially on line 6—6 of FIG. 5;

FIG. 7 is a perspective view, with parts broken away and in section, of structure and optical elements of the projection optical printer that embodies the projecting system of FIG. 3, illustrating parts and elements of an automatic control system;

FIG. 8 is a block diagram of the automatic control or servo motor system embodied in the printer illustrated in FIG. 7;

FIG. 9 is an elevational view of the exit side of another embodiment of the light valve, with parts broken away, which will perform the same light intensity adjustment as is attained by that of FIGS. 4, 5 and 6; and FIG. 9A is an end elevational view of one of the light valve vanes and its operating means that are illustrated in FIG. 9.

In the optical system of the projection optical printing apparatus, which is diagrammatically illustrated in FIG. 1 as being a simple version of a projection optical printer, by way of example, the reference numeral 10 identifies the "projector" section thereof and the reference numeral 11 identifies the "camera" section thereof. The optical system of FIG. 1 has embodied therein an improved light source sub-assembly of the present invention.

This light source sub-assembly comprises, in succession along the optical axis, a source of light rays, such as the filaments 112 of an incandescent lamp 12, and a curvilinear reflector 13 located on the back side thereof (as representative of light source elements housed in a conventional lamphouse), a condenser or transfer lens assembly 14 and an adjustable light valve 15 in the remote focal plane at the second principal focus of this condenser for projecting an in-focus image of the hot filaments of the lamp 12 to this focal plane. This light source sub-assembly also includes at least one field lens or collector 16 closely flanking one side of the focal plane in which vanes of the light valve 15 are located. Preferably, for arbitrary balance, a pair of the field lenses or collectors 16 are provided which closely flank opposite sides of this focal plane.

The light valve includes a pair of blades or vanes 17 and 18, which are located in the remote focal plane at the second principal focus of the condenser 14, that respectively may have to advantage opposed straight line edges 19 and 20 defining therebetween a light-passing slot of substantially uniform width from side to side. The beam comprising a bundle of light rays which is passed through the slot intervening the opposed vane edges 19 and 20 is margined by the full lines shown in FIG. 1. When a greater quantity of light at the camera gate opening is demanded for obtaining the desired printing results for any particular section of the series of images borne by the image bearing film being translated past the projector head gate 21 the light valve 15 is to be opened up as required, i.e., by separating the opposed vane edges 19 and 20, to increase the width of the slot intervening them.

When the source of light rays, e.g., the filaments 112 of incandescent lamp 12, is energized the bundle of light rays or beam emanating therefrom which exit through a directive hole in the enclosing lamphouse, pass through the condenser 14 to be focused at the focal plane location of the light-passing slot intervening the opposed and spaced apart edges 19 and 20 of the light valve vanes 17 and 18. Thus, in this focal plane is produced an image of the energized and glowing source of light rays 112. This image can there be observed as appearing to be an exact duplicate of at least a medial portion of that which is seen if one looks directly at the energized lamp 12. An unmasked medial portion of this projected image of the source of light rays appears in the slot or space intervening the separated light valve vane edges 19 and 20, such as that illustrated in dotted lines at 112–I in FIG. 1A, with marginal rays of the projected bundle of rays or beam being blocked out or stopped beyond these vane edges by the blocking and masking portions of the vanes 17 and 18 outward of their opposed edges.

The FIG. 1 printer optical system also includes as an essential part of the projector 10 a projector head equipped with a transversely-arranged gate 21 having a gate opening or aperture 22 past which is translated frame-by-frame along a transverse path (by suitable film advancing means, not shown) an image bearing strip film 23 for projection from the successive frames thereof of the images borne thereby. The projector head gate 21 is immediately preceded by a field collector achromat 24 which is located as close thereto as is permitted by structural limitations. Although it is not necessary to broader aspects of the present invention, it may be desirable to interpose between the adjustable light valve 15 and any field lens 16 flanking the output side thereof on one hand and the projector head gate 21 on the other hand a diffuser 25 in the form of plano transherent sheet having a finely roughened or ground surface to break up and tend to evenly distribute the light rays being passed therethrough.

The camera assembly 11 of the printer optical system of FIG. 1 also includes a camera or printing lens 26 and a framework supporting a transversely arranged camera gate 27 which is translatable along the optical axis by suitable mechanism. The camera gate 27 is provided with a printing opening or aperture 28 past which a raw stock strip film 29 is to be translated frame-by-frame (by any suitable film advancing means, not shown) for exposure of successive frames thereof to the images being projected from the successive frames of the image bearing film 23.

In a conventional manner, the printing lens 26 and the camera gate 28 are translatable along the optical axis with the axial translation of the camera framework and its gate 28 being correlated by suitable mechanism to, but differing from the axial translation of the printing lens, for the purpose of permitting the production of blow-up and reduction shots in sections of the raw stock film 29 being printed. In accordance with standard practice in this art, on zooming in for blow up of printed images from a 1:1 ratio of the sizes of the projected images and the printed images to gradually increasing enlargement of the latter of, e.g., 1:3, the camera 11 and its gate 27 are backed off progressively while the printing lens 26 is advanced progressively toward the projector gate 21. In accordance with this practice, on zooming out for gradual reduction of the sizes to, e.g., 4:1, the printing lens 26 and the camera with its gate 27 are both backed away with this lens progressively approaching the raw stock at the camera gate. Thus the camera framework and the gate 27 thereof are as far forward as they will ever be during printing operations at a 1:1 ratio of projected images at the projector gate 21 and the images being printed at the camera gate 27. Mechanism for performing this adjustment automatically of the printing lens 26 relative to the camera gate 27 is familiar to those skilled in the art as a "follow-focus" or "mechanical auto focus" and thus no details thereof are shown herein, such mechanism being represented diagrammatically at 30 in FIG. 1 with lines connecting it respectively to this camera gate and printing lens. As a result, any suitable driving means which may include an electrical motor, will cause the follow-focus mechanism 30 automatically to adjust progressively, along the optical axis translation of the camera gate 27 relative to the translation therealong of the printing lens 26.

FIG. 1B indicates that an externally threaded section 32 of a drive shaft 33 that is rotated by suitable motive means, such as an electric motor 34, may extend through casing 36 of a follow-focus mechanism 30, with its forward end 35 projecting therebeyond. Within this follow-focus casing 36 a nut may be fixedly carried by bracket 37 which supports the printing lens 26, with threaded shaft section 32 threadably engaged therethrough progressively to translate the printing lens forward toward the projector head, upon rotation of the shaft 33 in one direction, and simultaneously progressively to retract the camera gate 27 away therefrom to attain progressive blow up of the images being printed. This zooming in action begins from the relative positions of the printing lens 26 and camera gate 27 where the ratio of the images at the projector gate 21 and those projected to the camera gate for printing is 1:1. From such start positions of the printing lens 26 and camera gate 27 zooming out action may be progressively accomplished by rotating the drive shaft 33 in the opposite direction threadably to retract the printing lens 26 and the camera framework with its gate 27 simultaneously with the printing lens progressively approaching the camera gate. Such differential actions of the camera gate 27 are automatically accomplished by the follow-focus mechanism of known construction and operation which is housed in the casing 36. In accordance with standard practice the back end of the lens 26 is connected in light excluding fashion to the front end of the camera 11 by the usual bellows indicated in broken lines at 38.

Suitable independent mechanisms may be provided for axially translating the printing lens 26 with automatic follow focus adjustment of the camera 11 with its gate 27 therewith, and for simultaneously adjusting the opposed light valve vanes 17 and 18 at will and under the control of the skilled person operating the printer of FIGS. 1, 1A and 1B. However, as will be indicated hereinafter, an automatic control system in unique and novel combination with the optical system may be provided for adjusting the light valve vanes 17 and 18 simultaneously in response to the correlated axial translation of the printing lens 26 and camera gate 27. As will be more fully understood in connection with FIGS. 3, 7, and 8 such automatic adjusting or control means may require an electro mechanical transducer, e.g., a signal generating unit which responds to the correlated axial translation of the printing lens 26 and camera 11 for automatically dictating the adjustment of the width of the slot between the opposed edges 19 and 20 of the light valve vanes 17 and 18. For this purpose the drive shaft 33 may be provided at any suitable point, such as that indicated at 39, with a driving take off for operating such signal generating unit.

As is indicated in the diagrammatic optical system of FIG. 2 a modified form of the projection optical printer, which is improved in accordance with the teachings of the present invention, may embody the essential optical elements and equipment of FIGS. 1, 1A and 1B and, in addition, a plurality of projector heads, such as for the purpose taught in the identified Oxberry U.S. Pat. No. 3,040,619. In the optical system of FIG. 2 there is added to the projector section of the printer an additional projector head equipped with a transversely-arranged gate 121 having an aperture or opening 122 past which is to be translated (by suitable film advancing means, not shown) a strip film matte as is taught in the identified Oxberry U.S. Pat. No. 3,040,619. This gate 121 is that of an aerial image projector head, and it is immediately preceded by an additional field collector achromat 124, which may be similar to that at 24, suitably supported on this aerial image projector head. Since images borne by the successive frames of the strip film matte 123 are to be projected in focus to the plane of the image bearing film 23 being translated across the aperture or opening of the master projector head gate 21 there is interposed between the gates of these two projectors an imaging transfer lens assembly 40. This lens assembly 40 is independently translatable along the optical axis for maintaining in focus at the master projector head gate 21 the matte images which are projected to the latter thereby, and any suitable means under the control of the person doing the printing may be provided for accomplishing this independent translation.

The printer optical system of FIG. 2 is equipped with the previously described light source sub-assembly including, e.g., the light rays source lamp 12 (inclusive of its energized filaments 112), the condenser or transfer lens assembly 14, and the adjustable light valve 15 with its flanking field lenses 16. For purposes of conserving space, but more importantly for removing from the optical system the heat rays of the light beam being projected from the lamp 12 toward the focal plane where the adjustable light valve 15 is located, an obliquely oriented dichroic mirror 41 may be inserted in this light source sub-assembly between the condenser 14 and the light valve 15, preceding any field lens 16 associated with the latter, for turning the optical axis of this light source sub-assembly through an angle of less than 180°, such as 90°. This dichroic mirror 41 alternatively may be inserted in the optical system immediately following the light valve 15 and its forward flanking field lens 16 at a point preceding the diffuser 25. This dichroic mirror will reflect forward from its incident face the light rays for passage of a bundle thereof through the succeeding optical elements of the optical system. When this dichroic mirror is located at a point preceding the light valve 15 the bundle of reflected rays pass successively through the open slot of this light valve, the aerial image projector head achromat 124, the gate 121 of this head, the imaging transfer lens assembly 40, the achromat 24 of the master projector head and the gate 21 of the latter. A large proportion of the heat rays which are embodied in the bundle of light rays or beam emanating from the incandescent lamp filaments 112 will be transmitted through the oblique dichroic mirror 41 for desirable dissipation thereof out of the optical system, and to avoid undesirable heating of the optical elements therefollowing, such as the diffuser 25.

Since in such a plural projector head system of the type illustrated in FIG. 2 it is desirable that the aerial image projector head which includes the gate 121 and the mechanism associated therewith to translate the matte strip film 123 across the opening 122 of the latter, as well as the achromat 124 closely associated with this gate, be translatable together along the optical axis, this aerial image projector head also supports the described light source subassembly. In other words, common means support in succession at fixed positions relative to each other along the optical axis this light source sub-assembly, the additional achromat 124 and the aerial image projector gate 121 with this common means being adjustably translatable along the optical axis by any suitable means which may be under the control of the person operating the printer. For this reason the imaging transfer lens 40 is independently translatable along the optical axis.

It is indicated in FIG. 2 that there may be interposed in the light source sub-assembly, between the lamp 12 and the condenser or transfer lens assembly 14 a color correcting dichroic filter 42, which desirably may be made of glass. The filter 42 is swingably mounted so that the angle of incidence thereof with respect to the optical path projecting from the exit opening of the lamphouse, in which the light source lamp 12 is housed, may be changed as may be required in order to maintain constant the color temperature of this light source. As will be made apparent later this can be important with respect to maintaining identicalness of the color temperatures of the light sources of a pair of the projecting sections when embodied in a sophisticated version of the projection optical printer for the purpose of full color printing use thereof.

In FIG. 3 is illustrated the optical system of such a sophisticated projection optical printer which embodies a pair of the projecting sections, in association with a single printing lens and camera section. It will be seen that a primary projecting section of the optical system of FIG. 3 and the camera and printing lens assembly associated therewith are substantially like that illustrated in FIG. 2. There is added to the latter a secondary projecting section which is similar to the primary projecting section and the optical axis of this secondary projecting section is directed toward and intercepted by the oblique reflective interface 43 of a light transmitting and reflective mirror means, which may be in the form of a cubic beam splitter 44 formed by a pair of right angle prisms cemented together along the oblique plane constituting the reflective interface. This beam splitter 44 is inserted in the optical system of FIG. 2 by interposing it between the printing lens 26 and the gate 21 of the master projector head.

Thus this secondary projecting section of the FIG. 3 printer optical system includes the improved light source sub-assembly, an aerial image projector head gate and a master projector head gate with each having an achromat closely associated therewith, and an independently axially adjustable transfer lens assembly interposed therebetween, with the optical axis of this secondary projecting section directed to the center of the oblique reflecting interface 43 through which the optical axis of the primary projecting section extends to the center of the printing lens 26. In other words, this secondary projecting section comprises, in succession along the optical axis thereof, a light source lamp 212, a swingable dichroic filter 242, a condenser or transfer lens assembly 214, an oblique dichroic mirror 241, an adjustable light valve 215 with its flanking field lenses 216, an aerial image projector head gate 321 with its associated achromat 324, an imaging transfer lens 240, and a master projector head gate 221 with its associated achromat 224.

This optical system of the sophisticated projection optical printer, characterized by four projection heads with a pair thereof respectively embodied in a primary projecting section and in a secondary projecting section, as is illustrated in FIG. 3, is designed, e.g., for assembling during the printing procedure in the frames of the camera raw stock strip film 29 images of a background scene and image inserts of a foreground subject. Thus the film strip 23 which is translated across the aperture or opening 22 of the master projector head gate 21 of the primary projecting section may carry in successive frames thereof images of the desired background. A strip film 123 in the form of a black core matte will be translated across the aperture or opening 122 of the aerial image projector gate 121 in the primary projecting section. Also, the film strip 223 which is translated across the aperture or opening 222 of the master projector head gate 221 of the secondary projecting section will bear foreground images which include the desired insert images that are to be superposed on the background images projected from the strip film 23 to the camera raw stock strip film 29. Further, a white core matte strip film 323 is translated across the aperture or opening 322 of the aerial image projector head gate 321 of the secondary projecting section.

Let it be assumed, for purposes of illustration, that the background images carried in the successive frames of the strip film 23 which is translated, frame-by-frame, past the apertured gate 21 of the master projector head in the primary projecting section are those of a hilltop landscape. It may be desired that there be inserted in the frames of the camera raw stock strip film 29 foreground images surrounded by images of the background landscape, to give the impression that a foreground subject, such as a lady with windblown hair, which were printed in successive frames of the foreground image bearing film 223 that is being translated past the apertured master projector gate 221 of the secondary projecting section, were photographed at the site of the hilltop landscape rather than in a studio. In accordance with technique conventional to the projection optical printer art, the black core matte film 123 is prepared so that in the successive frames thereof areas which are the exact duplicates in size and shape of the desired foreground image insert, that are in the same aspects frame-to-frame with respect to the latter, are opaqued and surrounded by image-free, transparent fields. In accordance with this known technique, the white core matte film 323 bears in each of its successive frames a transparent area which exactly matches respectively the desired foreground image insert and the black core opaqued areas of the corresponding frames of the foreground image film 223 and black core matte 123, with these transparent duplicates of the desired foreground image inserts being surrounded by an opaque field. Accordingly, the black core matte 123 successively will blank out of the background images being projected from the successive frames of the background image bearing film 23 areas which are duplicates of the desired foreground inserts for projection into these blank areas images of the desired foreground inserts. The white core areas of the matte 323 will match up with the desired foreground image inserts of the foreground image bearing film 223 for projection thereof into the blank areas of the background images at the beam splitter transmitting and reflective interface 43, while the opaqued field of the white core matte will prevent rays from passing forward through the surrounding field areas of the successive frames of the foreground image film 223 for preventing any overlay upon the desired background image field areas being projected from the background image bearing film 23. The assembled background and foreground images for successive frames are then transmitted forward from the beam splitter 44 through the printing lens 26 for printing thereof together upon the successive frames of the camera raw stock film 29.

It will thus be seen that the opaqued core areas of the black core matte 123 and the transparent areas of the white core matte 323 must be kept exactly matched from frame-to-frame to the foreground image inserts throughout the printing procedure, including any zooming for blowup or reduction in any sections of the camera raw stock film 29 being printed. This printing procedure thus requires extremely accurate adjustments of the light intensities being delivered from the respective sources of light rays or lamphouses 12 and 212 of the primary and secondary projecting sections, and the desired balance of the lighting of the background image fields and foreground image inserts must be maintained throughout the printing procedures with adjustments thereof as may be required to attain this end.

These accurate adjustments of the light intensities from both light sources of the primary and secondary projecting sections is attained by adjustments of the slot openings in the light valves 15 and 215, as may be dictated by the skill of the person operating the printer. The practice of his skill is guided by a camera composing projection viewer which may comprise a mirror 141 preceded by a collector 116, and a projecting lens 45 so related to the camera gate opening 28 as to project upon a viewing screen 46 the composite images as assembled at the camera gate opening, so that the printer operator may check his composition before exposing any of the raw stock film. Since the adjustments of the intensities of the pair of light beams being projected respectively from the primary and secondary projecting sections is attained by the improved light valves 15 and 215 there is no need for a change of the $f$ stop of the printing or camera lens 26. Consequently, the desired maintenance of exact matching of the margins of the foreground image inserts with the margins of the blanked out cores of the background images in which such inserts are assembled is attained, so as to avoid efficiently the development and appearance in the images assembled in the successive frames of the camera film being printed any black marginal lines or light halos along the margins of the insert images of the lady with the flowing hair.

When, in accordance with prior printing technique, change of the $f$ stop of the printing lens is employed to adjust light intensity during zoom shots the attendant change in the sizes of the images cannot be avoided without practice of stop motion photography so that the cores of the mattes can be checked with respect to the insert images and resized as the zooms progress. In the case of the insert images being in the form of a subjects's upper torso and head with flowing hair, for example, the development of black line halo along bulk areas, such as her face, presents a problem of elimination many times less than that of the development of the black halo lines along minute structural details, such as the strands of the flowing hair. Despite the fact that critical matching may be initially attained at the beginning of the zoom shots the progression of the latter, with attendant required adjustment of the light intensities by means of $f$ stop adjustments of the printing lens, develops such black line halos which are most apparent along the margins of the smaller insert image elements, such as the strands of the lady's hair, when such camera film is exhibited. This is a difficulty which is so easily eliminated by the present improvement of the optical system of printers by incorporation therein of the new light source sub-assemblies featuring the adjustable light valves of the present invention which effect the desired changes in light intensities to a critical and commercially acceptable standard.

The incorporation of the swingable color correcting dichroic filters 42 and 242 at the light exit openings of the lamphouses in which the lamps 12 and 212 are respectively mounted provides an easy method for maintaining the color temperatures of the two separate light sources identical for full color printing. The two separate light sources are to be controlled independently since the beam splitter 44 reduces the quantities of light transmitted therethrough from different directions.

It will be noted from FIG. 1 that all of the optical elements of the projector section 10 of the simplest type of printer are located at relatively fixed points along the optical axis, while the position of the camera 11 is adjustable therealong, as is indicated by the double-ended arrow 50. It is also indicated by the double-ended arrow 51 in FIG. 1 that the printing lens 26 is also adjusted along this optical axis. As has been previously indicated, this axial adjustment of the printing lens and camera frame, i.e., the gate of the latter, the axial translation of the camera and its printing gate 27 being correlated to the translation of the printing lens by means of the follow-focus mechanism 30 to realize the results of follow-focus practice previously developed in this art.

In the aerial image projection optical printer, the optical system of which has been diagrammatically shown in FIG. 2, while the master projector head gate 21 and the achromat 24 associated therewith have relatively fixed positions along the optical axis the light source sub-assembly and the aerial image projector gate 121 and the achromat 124 associated with the latter are all adjustable along the optical axis (Z) as a unitary assembly, as is indicated by the double-ended arrow 52. The imaging transfer lens assembly 40 is likewise and independently adjustable along the optical axis (Z) as is indicated by the double-ended arrow 53. The double-ended arrows 50 and 51 respectively indicate correlated adjustability of the camera printing gate 27 and the printing lens 26 along the optical axis (Z).

In FIGS. 4, 5, and 6 are illustrated mechanisms for manipulating the pair of opposed vanes of the light valve 15. This is in the form of a housed assembly 55 in which is fixedly supported an upright partition 56 on the back side of which, as viewed in FIG. 4, is supported by suitable posts 57 (FIG. 5) a gear box and clutch assembly casing 58. This gear box and clutch assembly casing 58 in turn supports a high speed servomotor housing 59 and a three revolution potentiometer or nulling potentiometer housing 60. The servomotor is a reversible one of known construction and characteristics. As is known in the art, the clutch and gear box 58 contains a drive gear which is fixed on the motor shaft extending therethrough and this gear constitutes the first one of a speed reducing train. The last gear of this speed reducing train of gears is carried by a slip clutch mounted on the nulling potentiometer, the end of which extends out of the bottom of this casing being indicated at 61 in FIG. 5. Consequently, after three revolutions of the nulling potentiometer shaft 61, check means provided in this over-all light valve vane driving mechanism dictates stop thereof and causes this shaft to be stopped with the slip clutch permitting any overdrive or continued rotation of the servomotor shaft that may occur.

A pinion 62 is mounted on the extending end of the nulling potentiometer shaft 61 and is fixed thereto by a clamp 63 for drive thereby when the clamp is tightened. A larger gear 64 is mounted on and fixed to a bearing-supported shaft 65 with its supporting bearing unit 66 mounted in a hole extending through the partition plate 56. Beyond the partition plate 56 the head of the shaft 65 carries ring and cap clamping means 67 which fixes thereto a segmental plate 68 for rotation thereby. Bearing unit 66 supports for swing thereon of a radially projecting arm 69 with the end thereof extending beyond the circumference of the gear 64, as is best seen in FIG. 4. A pair of pins 70 and 71, which are actually separated and fixedly carried by partition plate 56, are located in the path of the projecting end of the arm 69 for limiting the swing of the latter through an arc to, e.g., about 28° to 30°. A pin 72, fixed on the gear 64, projects into the path of the radial arm 69 for engagement thereby. Thus, the gear 64 is limited in rotation in one direction by abutment of the projecting end of the arm 69 against the fixed pin 70 and contact of the gear-supported pin 72 against the opposite side of this arm, and a reverse rotation of this gear is limited by engagement of the projecting end of this arm back against the fixed pin 71 and the reverse rotation of the gear-carried pin 72 through almost a complete revolution until this gear-carried pin engages against the opposite side of this arm. Gear 64 is thus limited to a rotation in opposite directions through an arc of an extent up to approximately one revolution thereof. Consequently, the smaller drive pinion 62 which is meshed with the gear 64 is limited in rotation to the three turns of the nulling potentiometer shaft 61 that is permitted by the construction of this nulling potentiometer, since an overrun of more than three turns would damage the latter. It is this stop device which causes the nulling potentiometer shaft 61 to stop while the servomotor, housed at 59, may continue to overrun with this being accomodated by the slip clutch drive between the reduction gearing mounted to the motor shaft and the slip clutch mounted upon the nulling potentiometer shaft.

A cam 73, best seen in FIG. 6, is fixed to the shaft 65 by the segmental plate 68 and a plurality of screws 74 which fix this cam and plate together. Accordingly, the cam 73 is rotated by the gear shaft 65, in the clockwise direction as viewed in FIG. 6. As is therein indicated cam 73 is provided peripherally with a cam track 75 which is contoured through an appreciable portion of a full turn. A suitable cam follower 76, preferably in the form of a roller, is carried by a segmental arm or plate 77 which is pivotally supported at 78 (FIG. 6) by a pivot shaft 79 in turn rotatably supported by a bearing 80 mounted through the partition plate 56 (FIG. 5). A biasing tension spring 81 is fixed at one point 82 to the pivoted follower arm 77 and at another point 83 to the partition plate 56, so as to tend to urge this pivoted follower plate rotationally in a clockwise direction, as viewed in FIG. 6, for urging the follower roller 76 to continuous contact of the cam track 75. The position of the cam 73, as shown in FIG. 6, is at its limit of clockwise rotation.

The pivoted follower plate or arm 77 also carries an additional follower 84, appreciably arcuately spaced from the follower 76, and this second follower may also be in the form of a roller which is supported by a position adjusting block 85 (FIG. 6). A pair of setscrews 86 and 87 respectively bear against opposite ends of the block 85, and, by support on the follower arm or plate 77, permit adjustment of this block along a line arranged somewhat obliquely to a tangent of a radius of this follower arm extending to the axis of the follower roller 84.

As will be best understood from FIGS. 5 and 6 a freely rotatable shaft 90 is rotatably supported by a bearing unit 91 mounted through the partition plate 56 and carries, fixed thereto, a block 93 for rotating this shaft. The block 93 is biased by a tension spring 94 which has one end thereof connected to this block at 95, at a radial distance from the axis of the shaft 90, and its other end fixed at 96 to the partition plate 56. The block 93 has mounted thereto, by screws 97, a sine bar 98 which has a guide surface 99, provided by one edge thereof, that bears against the follower roller 84 for slide therealong of this follower, which thus constitutes slide means. This sliding contact of the sine bar guide surface 99 and the slide means or follower roller 84 is maintained by the constraining action of the biasing tension spring 94. Accordingly, when the pivoted follower arm or segmental plate 77 is swung back and forth by rotation of the cam 73 the slide means 84 glides back and forth along the sine bar guide surface 99 to rotate the sine bar back and forth. The inclusion of this sine bar 98 and its wiping follower 84 in the light valve vane manipulating mechanism advantageously avoids a need for steep pitch of the cam track 75, which thus facilitates wipe therealong of the follower 74.

Rotation of the shaft 90 back and forth through an arc or a portion of a single turn is effected by the swing back and forth of the sine bar 98, such as between the points (I) and (II), indicated in FIG. 6, i.e., between the full line position of this sine bar shown therein and the dot-dash position indicated at 199. This swing of the sine bar manipulates simultaneously the light valve vanes 17 and 18 alternately to advance and retract their opposed edges 19 and 20 with respect to each other. For this purpose, the preferred form of the light valve adjusting means includes a symmetrical parallelogram mechanism comprising a pair of opposed and substantially parallel side bar members 100 and 101 (see FIG. 4, and also the dotted line showing of a portion of the former in FIG. 6). This parallelogram mechanism also includes a pair of opposed and substantially parallel end bar members 102 and 103 that are spaced apart in the direction of the longitudinal dimensions of the side bar members 100 and 101 and are pivotally connected thereto at longitudinally spaced points 104, 105, 106, and 107. As will be best understood from FIG. 4, the light valve vane 17 and the parallelogram side bar member 100 together constitute a Z-shaped member. Likewise, the light valve vane 18 and the parallelogram side bar member 101 together constitute another Z-shaped member. The end bar member 102 is medially fixed to the shaft 90 while the end bar member 103 is medially supported upon a stub shaft 108 rotatably supported in like manner upon the partition plate 56. Accordingly, when the shaft 90 is rotated back and forth it swings therewith the end bar member 102, so as to cause the parallelogram section of this light valve vane structure alternately to collapse and expand.

This collapsing and expanding action of the parallelogram simultaneously causes the opposed vane edges 19 and 20 of the light valve vanes 17 and 18 alternately to retract retrogressively from and to advance progressively toward or approach each other, so as alternately to increase and decrease the intervening space which constitutes the opening in the presently improved light valve. In other words, the rotation of the end bar member 102 in one direction is effected when the follower 76 is advanced in one direction by the continued contact with the track 75 of the cam 73 as the latter is rotated in one direction, and the rotation of this end bar member in the opposite direction is effected when this follower is retracted in the opposite direction by continued contact with this cam track as the cam is rotated in the opposite direction. Thus, the point of contact of follower 76 with the cam track 75 advances linearly in radial degrees so that the square output of the cam 73 causes the advancing and retracting of the opposed straight line edges 19 and 20 of the light valve vanes 17 and 18 to be such, relative to each other, as to adjust the width of the intervening light-passing slot or space in increments of continuous motion which are directly related to $f$ stop adjustments thereof.

It will be understood that, while the light valve vane manipulating mechanism illustrated in FIGS. 4, 5, and 6 includes, as driving means, the servomotor 590 in housing 59, the housed gearing and clutch in box 58 and the drive shaft 61 of the nulling potentiometer 600 in housing 60, such mechanism may be used to advantage in adjusting the light valve opening or slot between the opposed vane edges 19 and 20 if the drive of this adjusting mechanism is effected by various types of electrical motors, other than servomotors. Such other electrical motor would be drivably connected to both of the light valve vanes through any suitable means, such as reduction gearing and vane manipulating mechanism, with the operation of such motor being under the control of the person operating the printer.

The provision of the nulling potentiometer 600 in housing 60, coupled to the driving servomotor 590 in housing 59, is particularly designed for advantageous use of the light valve vane adjusting mechanism of FIGS. 4, 5, and 6 in an automatic control system which desirably may be associated with sophisticated versions of the improved printer, the optical systems of some of which are illustrated by way of example in the present drawings. However, a simple version of the printer embodying the optical system of FIGS. 1, 1A, and 1B may include position control means which, on one hand, is operatively connected to a mechanical drive associated with the camera gate drive comprising motor 34 and drive shaft 33 and, on the other hand, is operatively connected to the light valve vane moving means through that portion of the mechanical drive of the mechanism illustrated in FIGS. 4, 5, and 6 which intervenes the driving pinion 62 and the light valve vane adjusting parallelogram mechanism 100–108. Alternatively, such a simple single projector head printer may have associated therewith an automatic light valve control system that would embody in the position control means a signal input potentiometer coupled to the motor adjustment drive shaft 33, such as at a point 39 indicated in FIG. 1B, and the entire FIGS. 4, 5, and 6 assembly including the servomotor 590 in housing 59 and its housed reduction gearing unit 58, the nulling or feedback signal potentiometer 600 in housing 60, and a suitable summing amplifier network to which the input signal and the nulling potentiometer signal are supplied in opposition by suitable circuit connections with this amplifier network being connected to the servomotor for dictating operation of the latter. Such automatic control system, when employed with a printer optical system of the type illustrated in FIG. 2 would additionally embody another input signal potentiometer associated with or coupled to the mechanism which translates the imaging transfer lens 40 along the optical axis. The optical system of FIGS. 1, 1A, and 1B and the FIG. 2 printers may include an additional signal input potentiometer which is manually adjusted or operated by the person operating the printer and is deemed a selector light control input signal potentiometer. If such an automatic control system is embodied in a printer which is characterized by a primary projecting section and a secondary projecting section, as is proposed in FIGS. 3 and 7, each of the two projecting sections would have an automatic control system of the FIG. 2 type associated therewith.

The FIG. 3 optical system may be embodied in such a sophisticated projection optical printer which includes the primary and secondary projecting sections in the manner illustrated in FIG. 7. A perspective view of optical elements of a printer which embodies the optical system of FIG. 3, and the parts of an automatic control system associated therewith is shown in FIG. 7. In the latter it is indicated that the drive shaft 33 which translates the camera 11 along the optical path may carry any suitable takeoff point, such as that indicated at 39, a drive worm 110 meshed with a gear 111 that is fixedly carried by a shaft 112, with the latter fixedly supporting thereon a rotatable cam 113. A suitable cam follower 114 rides against the peripheral track 115 of this cam 113, longitudinally to translate a toothed rack 116. A pinion 117 meshed with the rack 116 as to be rotated by the latter to manipulate the rotor of a signal generator 400, which may constitute a first input signal potentiometer of the servomotor control system that serves as the automatic control device. The mechanical elements 110 to 117 inclusive, and the electrical signal generating device 400 together constitute a first or camera electromechanical control transducer.

The version of the automatic servomotor control system which is illustrated, by way of example, in FIG. 7 as being associated with each of the pair of primary and secondary projecting sections of the therein illustrated sophisticated version of the projection optical printer, is designed to effect automatic adjustment of the light-passing space between the opposed light-blocking vanes of the light valve in each of these projecting sections. It will be seen therefrom that this servomotor control system which, for example, is associated with the primary projecting section includes three signal generators or input signal potentiometers, each of which is of the conventional three-terminal type. These three input signal potentiometers are the potentiometer 400 which generates a signal at output terminal 401 indicative of the position of the printing lens 26 and the framework of camera 11 (and thus the gate 27 thereof) along the optical axis; a manually operated selector light control potentiometer 402, which generates a signal at output terminal 403 indicative of the setting of the pointer 404 with respect to the calibrated dial 405 (the knob 406 which carries this pointer being fixed on shaft 406a to rotate the potentiometer wiper contact); and a potentiometer 407, which generates a signal at output terminal 408 indicative of the position of the imaging transfer lens 40 along the optical axis.

As is indicated in FIG. 7 the imaging transfer lens in each of the projecting sections, such as that indicated at 40 in the primary projecting section, carries a bracket arm 409 to move with this lens as the latter is translated along the optical path by any suitable drive mechanism (not shown) under the control of the person operating the printer. On a shaft 410 carried by bracket 409 is pivotally supported a gear segment 411 having its teeth meshed with a pinion 412 which adjusts the wiper contact of the potentiometer 407. For the purpose of swinging the segmental gear 411 progressively the segmental gear 411 carries a lateral arm 413 equipped with a roller 414 that rides along the top edge 415 of a fixed cam wedge 416, and the operative section of this top edge may be arranged along a straight line which has uniform slope to dictate linear output of the third input signal potentiometer 407. In addition to the camera electromechanical control transducer there is thus provided a second electromechanical or selector light control transducer embodying the potentiometer 402 and its dialed manipulator 406 and 406a, and a third or imaging transfer lens electromechanical control transducer embodying the potentiometer 407 and its cam manipulator 409 to 416 inclusive.

The output terminals 401, 403 and 408 respectively of these three input signal potentiometers 400, 402 and 407 are respectively connected by conductors 421, 423 and 428 to input terminals 422, 424, and 429 of the summing network of a servomotor control amplifier 430. Amplifier 430 is provided with output terminals 431 and 432 which are respectively connected by conductors 433 and 434 to input terminals 435 and 436 of servomotor assembly 437 (FIG. 8) that is enclosed within housing 55. This servomotor assembly, the components of which will be later discussed in connection with the block diagram of FIG. 8, is operatively responsive to output signals to move both of the vanes 17 and 18 of the light valve 50 simultaneously in opposed relation toward and away from each other to desired relative positions for adjusting addition, servomotor assembly 437 is operative to generate at output terminal 439 a signal indicative of the instantaneous positions of the light valve vanes 17 and 18, this input signal being generated by the housed feedback or nulling potentiometer 600 (FIG. 8) enclosed within the housing 60 (FIG. 5) are supplied to the terminal 439 by conductor 441. The output terminal 439 is interconnected by conductor 442 to the amplifier feedback input terminal 443. A fourth or nulling potentiometer electromechanical control transducer is provided by the nulling potentiometer 600 and its mechanical drive including the servomotor 590 and drive shaft 61.

A suitable power supply (not shown) of conventional form may be employed to provide power to the components of the servomotor control system. For example, an AC source may provide a first phase voltage for excitation of the field winding of servomotor 590, which may be a reversible AC motor, and may further provide a second phase-displaced voltage for application through amplifier 430 to the motor control winding. This latter voltage will be appropriately switched through amplifier 430 to the output terminals 431 and 432 thereof when demanded by the summation in the amplifier network of the signals generated by the potentiometers 400, 402, 407, and 600. Excitation for these potentiometers and for any active elements of amplifier 430 is preferably direct current voltage generated by a suitable rectifier and filter connected to the AC source. This direct current voltage is applied across the resistance of each of the potentiometers and will provide differing DC voltages on the wipers thereof depending upon the position of the potentiometer shafts.

The servomotor control system, which is diagrammatically shown in FIG. 8, that is associated with the primary projecting section of the FIG. 7 optical system is duplicated for the secondary projecting system thereof that directs it optical output beam to the beam splitter reflective interface 43. Thus this second servomotor control system embodies similar units which are identical in FIG. 7 by similar numerals that carry prime designations. Since these parallel servomotor control systems are preferably identical the operation of only one thereof need be described hereinafter.

It will be understood that in the optical system of FIG. 7, which embodies a primary projecting section and a secondary projecting section of similar construction, each embodying or having associated therewith the servomotor system of FIG. 8, each of these projecting sections includes a pair of mechanical translators which are under the control of the person operating the printer. One of these mechanical translators includes the drive, such as the motor-driven worm shaft 33 and the housed follow-focus mechanism 30, which translates at the will of the operator the printing lens 26 and, in correlated fashion, the framework of the camera 11 and its gate 27 along the optical axis. Thus the mechanical translator is termed the "camera translator." The other or second mechanical translator adjusts the position of the imaging transfer lens 40 along the optical axis, and is thus termed the "imaging transfer lens translator." The latter may include a suitable motor controlled by the operator of the printer and suitable drive mechanism operated by such motor to move this imaging transfer lens along the optical axis, as may be dictated by the imaging results projected on the viewing screen 46 (FIG. 3). The camera translator has associated therewith the camera control transducer which is automatically adjusted in response to the operation of the former. The imaging transfer lens translator has associated therewith the imaging transfer lens control transducer which is automatically adjusted in response to the operation of this second translator. As a result, electrical signals are generated by the camera and imaging transfer lens control transducer potentiometers 400 and 407 to become additive in the electrical network of the amplifier 430.

The selector light control transducer, which is a linear control device, generates an input signal by virtue of the manual manipulation of the knob 406 and the shaft 406a connecting this knob to the contact slider in the transducer 402, to generate a signal also to be imposed upon the electrical network of the amplifier 430 for summing thereof with the input signals from the control transducers 400 and 407. The feedback potentiometer 600 and its servomotor drive constitute a nulling transducer which converts the motion of the drive of its contact slider by the servomotor 590 through the gearing mechanism in gear box 58 for creating an input signal that is supplied to the electrical network of the amplifier 430 in opposition to the summed signals from the transducers 400, 407, and 402.

Let it be assumed that the primary projecting section, which embodies the aerial image projector head that contains the gate 212, requires in operation adjustment of the width of the space or slot 438 intervening the opposed edges 19 and 20, of the light valve vanes 17 and 18 of the adjustable light valve 15. A demand for adjusting the opening 438 of the light valve 15 is initiated by operator adjustment of the axial position of the framework of camera 11, the position of pointer 404 on dial 406 of the selector light control transducer 402 and/or the adjustment of the imaging transfer lens control transducer 407. Electrical signals corresponding to the positions of these elements are generated by potentiometers 400, 402, and 407, which are electrically coupled into amplifier 430 respectively at input terminals 422, 424 and 429. The summing network of amplifier 430 generates a signal which in turn causes the amplifier to generate at terminals 431 and 432 a circuit output signal which is conducted to servomotor assembly 437 at terminals 435 and 436 and particularly to the servomotor 590 thereof. Depending upon the sense or phase of the circuit output signal, this servomotor 590 will drive its mechanical output shaft 591 in clockwise or counter-clockwise direction. This shaft 591 is directly coupled through a slip clutch to the speed reducing gear mechanism in gear box 58, the gear train of which is suitably stepped down in accordance with the accuracy desired in resolving the circuit output signal from amplifier 430 into mechanical motion at the vanes 17 and 18 of light valve 15. Drive mechanism in gear box 58 provides a first mechanical output through gearing 62, 64 which is directly coupled at 65 to cam 73. Cam follower 76 is employed to displace a further drive mechanism 760 (comprising swing follower 77, sine bar 98 and rotary shaft 90, see FIG. 6) which is coupled to vane manipulating mechanism 100–108 (comprising the parallelogram mechanism of FIGS. 4–6).

The drive mechanism of the servomotor 590 also provides a second mechanical output through the speed reducing mechanism 580 in gear box 58 which is directly coupled to feedback or nulling transducer potentiometer 600. The driving of this feedback potentiometer 600 provides an instantaneous indication of the relative positions of the vanes 17 and 18 of the light valve 15 by generating an output nulling signal corresponding to such relative positions. This nulling signal is conducted over connection 441 to terminal 439 of the servomotor assembly 437, whereupon it is fed into input terminal 443 of amplifier 430.

Amplifier 430 will continue to generate a circuit output signal compelling adjustment of the vanes 17 and 18 of light valve 15 until the input signals at terminals 422, 424 and 429 are counterbalanced or nulled by the signal imposed at output terminal 443. If, for example, the system is quiescent and an operator demand for increased light intensity is made, by appropriate higher setting of the potentiometer 402 of the selector light control transducer, the amplifier summing network will generate a signal of greater magnitude than the zero voltage signal generated in the quiescent system. This signal will cause output section of amplifier 430 to generate a circuit output signal until the potentiometer 600 of the nulling transducer generates a counterbalancing signal.

The dial 406 of the selector light control transducer preferably is divided into or calibrated in a plurality of digits each representing a light intensity or density change of 0.025 Log. E (the equivalent of that attained by adjustment of one-twelfth of an $f$ stop of an iris diaphragm) which is here attained by the adjustment of the slot or space 438 intervening the light valve vanes 17 and 18, in response to the output signal of the potentiometer 402 adjusted by manual knob 406. Amplifier 430 will sense this change at input terminal 424 and will, contrary to its zero output at quiescence, generate a circuit output signal to compel adjustment of the light valve vanes 17 and 18 to open up the slot or space 438 therebetween. Servomotor assembly 437 will respond accordingly by displacing drive mechanism 62, 64 the displacement continuing until the feedback potentiometer 600 of the nulling transducer effects a rebalancing of the input of amplifier 430. The system will thereby again achieve a quiescent state, awaiting further operator adjustments. It will thus be understood that the selector light control transducer can be used to override the other transducers embodied in the servomotor system in which it is connected.

It will be evident that the system will respond in the above manner to similar adjustments of the correlated axial positions of the printing lens 26 and the framework of camera 11, and/or the axial positions of the transfer lens 40. When camera 11 and the printing lens 26 are translated along the optical axis in correlated manner by operation of the camera translator and follow-focus mechanism for enlargement and/or reduction of the images being imposed upon the raw stock film in the camera this axial translation of the latter adjusts the camera transducer 400 to cause an electrical input signal to be supplied from the latter to the amplifier network for dictating the operation of the servomotor 590. If this adjustment of the camera transducer 400 is the only adjustment made at this time the servomotor 590 will be energized so as to cause the mechanism driven by the latter to adjust the relative positions of the light control vanes 17 and 18 until such time as the control system senses equalization between the output signal of the nulling control transducer 600 and the input signal of the camera control transducer that assures the required adjustment of the light intensity by the manipulation of the light control valve 15. However, if the imaging transfer lens 40 is also adjusted along the optical axis by its mechanical translator at the dictation of the printer operator the attendant adjustment of the control transducer 407 will generate a signal so that any one of three following conditions may be developed.

1. The output signal from this imaging transfer lens control transducer 407 could be additive in polarity to the output signal from the camera control transducer 400, in which case the amplifier input network will sense the equalization required by the addition of those output signals and the summing therewith of the feedback signal supplied by the nulling control transducer 600 to cause such drive of the servomotor 590 (with attendant adjustment of the light valve 15) as to attain this equalization.

2. The output signal from the transfer lens control transducer 407 could be subtractive in polarity with respect to the output signal from the camera control transducer 400, in which case the amplifier input network will sense the lesser equalization demanded by the summing of these output signals and the feedback signal and command such servomotor drive as to attain it.

3. The output signal of this control transducer 407 could be equal but opposite in polarity to the output signal of the camera control transducer 400, so that equality would be sensed by the amplifier input network and the servomotor would remain undriven so that there would be no change in the size of the light-passing slot of the light valve.

It is is found that the changes in the light intensity required for any given enlargement or reduction of the raw stock images exceeds the potential of the light valve 15, then the selector light control manipulating knob 406 may be used by the printer operator to accommodate this condition. For example, if the maximum intensity of the light required is greater than that available when the light valve 15 is fully opened, then the selector light control knob 406 is manually adjusted so that the output signal from transducer 402 dictates adjustment of the light vanes 17 and 18 of the light valve 15 to cause these vanes to simultaneously approach each other for reducing the width of the intervening slot 438. The printer operator then reduces the speed of the drive of the mechanism which translates the raw stock past the camera gate opening so as to effect a decrease in the shutter speed sufficuently to provide a net result of the illumination at the camera gate which is equivalent to that before such selector light control adjustment was made. Such manipulative adjustments assure maintenance of the color temperature of the light source at all times and the intensity of the illumination afforded by the light valve 15 can be adjusted at the camera gate aperture in increments of 0.025 Log. E. When this manually operated selector control transducer 402 is adjusted it will automatically cause the vanes 17 and 18 of the light control valve 15 to adjust relative to each other until such time as the nulling control transducer 600 senses equalization between the setting of the selector light control and the light control valve.

When the printer is in the sophisticated form which embodies the optical system of FIG. 7, in which both a primary projecting section and a secondary projecting section of like assembly of optical elements is employed, it will be realized that the total of the intensity of illumination imposed in the frames of the raw stock at the camera gate opening 28 is the additive result of light emanating from the pair of light source sub-assemblies of these two sections. In other words, the quantity of the light passing through the adjustable light valve 15 of the primary projecting section and that of the light passing through the adjustable light valve 15' of the secondary projecting section are additive. Accordingly, the pair of camera control transducers 400 and 440' are adjusted simultaneously i.e., their sliding contacts are manipulated from the common shaft which is rotated by the rack pinion 117 to generate comparable input signals supplied to the separate circuit networks of the amplifiers 430 and 430'. Consequently, the servomotors 590 of the two parallel, but separate servomotor control systems (one of which is shown in FIG. 8), cause generation of feedback transducers or potentiometers signals simultaneously to impose control upon the adjustments of the pair of light valves 15 and 15' in these two servomotor control systems. This assumes that, before adjusting the axial positions of the camera gate 27 and the printing lens 26 in correlated fashion along the optical axis to obtain zoom blowup or reduction of the printing images at the camera gate aperture, positions along the optical axes of the imaging transfer lenses 40 and 40' of the pair of projecting sections for automatic adjustments of the lens transducers 407 and 407', as well as the manual adjustments of the selector light control transducers 402 and 402', will have been effected by the printer operator to his satisfaction. The automatic adjustments of the camera transducer 400 and 400' by the common mechanical translator associated with the camera and its follow-focus mechanism will thus assure that the separate pair of servomotor systems will cause simultaneous adjustment of the openings through the light valves 15 and 15' as the demands of the zooming adjustment of the camera frame and its printing gate impose.

When operating the sophisticated version of the printer illustrated in FIG. 7, the operator may initially choose, with the use of the viewing screen 46, an initial setting of the selector control transducer 402 which provides proper light intensity for a certain scene. For example, this may be attained by a setting of the selector dial pointer 404 for a 1:1 ratio of the sizes of the projector print images and the projected images at the opening of the camera gate. He may wish to provide a 1:2 blowup zoom thereof, which he tries without printing the raw stock in the camera 11 by advancing the printing lens 26 toward the projector gate 21 with attendant backing away of the camera by the automatic follow-focus mechanism 30. The light valve 15 will be automatically and progressively opened up. If, before the trial zoom is completed, the light intensity ceases at a point progressively to increase through the remainder of the desired zoom the operator will then test his controls with manipulation of the selector control transducer 402 until the light requirements are attained for the entire zoom. He then prints the zoom.

In the modified form of the improve light valve shown in FIGS. 9 and 9A the opposed and transversely aligned light valve vanes 117 and 118 are guided for motion relative to each other in the transverse focal plane at the second principal focus of condenser or transfer lens 14, and with respect to the optical axis or zero point 500, by suitable guide means which are diagrammatically illustrated by the plurality of guide rollers 501. Thus they may be continuously and progressively moved toward and retracted away from each other with preferred maintenance of the parallelism of their opposed edges 119 and 120. For the purpose of effecting such relative vane motion the back edges 502 and 503 of vanes 117 and 118 may be arranged obliquely along straight lines. Suitable cam wedges 504 and 505 are provided respectively to dictate such advance and retraction of the vanes 117 and 118. For this purpose, the cam wedge 504 has a longitudinal slot 506 in the front edge thereof to provide a straight line camming surface 507 at the bottom of this slot, and cam wedge 505 is similarly slotted at 508 to provide a similar straight line camming surface 509. The back edge zones of the vanes 117 and 118 are slidably inserted respectively in the slots 506 and 508, with the vane edges 502 and 503 respectively riding on camming surfaces 507 and 509.

In FIGS. 9 and 9A light valve embodiment any suitable guide means may be provided for guiding longitudinal motion of the cam wedges 504 and 505, such as the plurality of rollers diagrammatically illustrated at 510. The vane back edges 502 and 503 respectively may be maintained in sliding contact with the camming surfaces 507 and 509 by any suitable means, such as conventional biasing springs (not shown) which may be of the tension type having one end of each connected to one of the vanes and the other end thereof anchored to fixed structure. Alternatively, the vane back edge zones and the receiving slots 506 and 508 may be matingly shaped to prevent disengagement except by relative longitudinal movement, e.g., T-shaped. Suitable means may be provided to apply simultaneously like longitudinal thrust and retraction to the camming wedges 504 and 505, as is diagrammatically illustrated at 511.

When the degree of obliquity or of the pitch of the mated vane back edges and camming surfaces 502, 507 and 503, 509 of the FIGS. 9 and 9A structure is the same and the longitudinal translations of the cam wedges 504 and 505 are equal the advance and retraction of the opposed vane edges 119 and 120 relative to the optical axis 500 are precisely equivalent. The relative positions of such opposed vane edges 119 and 120 in such forward and backward adjustment thereof respectively are illustrated in FIG. 9 by dot-dash broke lines 219 and 220 and dot-dash broken lines 319 and 320. If this pitch of the vane back edges 502 and 503 and of the camming surfaces 507 and 509 is of small value relative large increments of longitudinal motion of cam wedges 504 and 505 will dictate very minute increments of continuous forward thrust or retraction of the opposed vane edges 119 and 120. It will thus be understood that the light valve vanes 117 and 118 are movable simultaneously in opposite directions, relative to each other and the optical axis 500, at equal increments of continuous motion for infinite variability of the width of the light-passing space intervening the opposed parallel edges thereof, which is essential to the proper operation of the light valve in the improved light source sub-assembly of the present projection optical printing apparatus.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described our invention, what we claim as new and desire to secure by Letters Patent is the novel subjects matter defined in the following claims.

1. In projection optical printing apparatus for variable enlargement and reduction of a projected image in exposing light sensitive material to the latter, optical system comprising, in succession along the optical axis of a light beam path, an apertured support for a film print that bears an image to be recorded with this support extending in a print plane transversely of and substantially normal to the optical axis with the latter extending substantially through the center of the support aperture, a printing lens substantially axially aligned with the optical axis, and a transversely extending support for light sensitive material through the center of which the optical axis extends and located at a plane of printing reproductions by said printing lens; and means to translate along the optical axis one or more of said light sensitive material support, said printing lens and said film print support relative to the others thereof; wherein the improvement comprises as a light source sub-assembly preceding said film print support
   a. a source of light rays to which the light sensitive material responds for recording thereon a replica of the projected image,
   b. means providing in a transverse plane an in-focus image of the light source preceding said film print plane, and
   c. a mechanically adjustable light valve in said light source image plane comprising light-blocking and masking transverse means having opposed edges located at substantially equal distances on opposite sides of said optical axis to define an intervening light-passing space with said light valve means being simultaneously movable both directionally toward and away from said optical axis and in extent at equal increments of continuous motion for infinite variability of said intervening light-passing space.

2. In a projection optical printer which comprises, in succession along the optical axis of a light beam path, a light source sub-assembly; a projector head having a transversely arranged gate located at a relatively fixed position along the optical axis and provided with a projecting aperture, through the center of which the optical axis extends, for translation of an image bearing strip film along a certain transverse path past said aperture, with field collector lens means immediately preceding said gate for concentration in the latter of the light rays emanating from the light source sub-assembly; a printing lens movably translatable along said optical axis; and a transversely arranged camera gate translatable along said optical axis with the translation of the latter being correlated to the translation of said printing lens, said camera gate being provided with a printing aperture, through the center of which the optical axis extends, for translation of a raw stock strip film along a certain transverse path that is substantially parallel to the image film path and past said printing aperture for exposure to the image bearing beam projected through the printing lens from the projector gate aperture; wherein the improvement comprises, as optical elements of said light source sub-assembly that have fixed positions along the optical axis relative to each other;
   a. a source of light rays to which the raw stock film responds for recording thereon a replica of images borne by said strip film at the projector head gate,
   b. a succeeding condenser or transfer lens assembly having its first principal focus located at said source of light rays, c. an adjustable light valve in the remote focal plane at the second principal focus of said transfer lens for providing an in-focus image in said focal plane of unmasked portions of said light rays source when energized with said light valve being in the form of a pair of light-blocking and masking vanes having opposed, spaced apart edges arranged in said focal plane and located at substantially equal distances to opposite sides of said optical axis, d. means for moving said light valve vanes simultaneously both directionally toward and away from said optical axis and in extent in equal increments of continuous motion for progressive approach and retrogressive retraction of said opposed edges toward and away from each other with substantial maintenance of the equality of their spacings to opposite sides of said optical axis for adjusting with infinite variation the space intervening said opposed edges to effect the required change in the quantity of light passed through the intervening space with maintenance of substantial equal distribution of the light along this space, and e. at least one achromat collector means closely flanking one side of said light valve.

3. The projection optical printer of claim 2 in which a dichroic mirror intervenes said condenser and the combination of said light valve and its flanking field lens for turning the optical axis through an angle of less than 180° and for transmitting therethrough out of the optical system undesirable heat rays.

4. The projection optical printer of claim 2 in which a diffuser in the form of a plano translucent sheet having a finely ground surface is located beyond said light valve and precedes and achromat collector means.

5. The projection optical printer of claim 2 in which means are provided to move said light valve vanes simultaneously, said vane moving means comprising a driven rotary cam means provided with a contoured track and follower means urged to continuous contact of the latter, means to rotate said cam in a manner which rotatably translates said track with the advancing point of contact thereof by said follower means progressing linearly in radial degrees, and means connecting said follower means to said movable light valve vanes in a manner simultaneously to advance and retract the opposed edges of the latter relative to said optical axis.

6. The projection optical printer of claim 5 in which said light valve includes a symmetrical parallelogram mechanism comprising a pair of opposed and substantially parallel side bar members and a pair of opposed and substantially parallel end bar members that are spaced apart in the direction of the longitudinal dimensions of said side bar members and are pivotally connected at longitudinally spaced points to the latter whereby rotation of one of said end bar members in one direction causes said side bar members progressively to approach each other and when rotated in the opposite direction causes said side bar members retrogressively to retract from each other, said side bar members respectively carrying one of said light valve vanes for the simultaneous motion of the opposed edges of the latter toward and away from each other; said connecting means includes means to rotate one of said end bar members in one direction when said follower means is advanced in one direction by contact with said cam track and to rotate it in the opposite direction when said follower means is retracted in the opposite direction by contact with said cam track.

7. The projection optical printer of claim 6 in which said follower means is in the form of a pivotally mounted biased arm carrying a follower held in contact of said cam track by the biasing of said pivoted arm whereby the latter is swung back and forth by the rotation of said cam means; and said connecting means is in the form of slide means carried by said follower arm for swing therewith an a sine bar connected to said rotatable parallelogram end bar member for swing of the latter thereby with said sine bar having a generally radiating guide surface constrained toward contact of said slide means whereby when said pivoted follower arm is swung back and forth by rotation of said cam means said slide means glides back and forth along said guide surface of said sine bar to rotate the latter back and forth.

8. The projection optical printer of claim 2 in which the optical system includes an additional projector head to serve as an aerial image projector interposed between said light valve and the first-mentioned projector head with the latter serving as a master projector, said aerial image projector including a similar apertured gate for translation therepast of an additional image bearing strip film which may serve as a matte, additional field collector lens means immediately preceding said aerial image projector gate beyond said light source sub-assembly; common means supporting in succession at fixed positions relative to each other along the optical axis said light source sub-assembly, said additional field collector means and said aerial image projector gate with said common means being adjustably translatable along said optical axis; and an imaging transfer lens assembly interposed between the gates of said aerial image and master projector heads which is independently translatable along said optical axis.

9. The projection optical printer of claim 8 in which said light source sub-assembly, said condenser, said adjustable light valve with its flanking field lens, said aerial image projector, said axially adjustable imaging transfer lens assembly, and said master projector with its associated field collector means together constitute a primary projecting section; said optical system including an oblique light transmitting and reflective mirror means interposed between and optically axially aligned with said primary projecting section and said printing lens; and a secondary projecting section functionally similar to said primary projecting section having its optical axis directed toward and intercepted by the oblique reflective surface of said interposed mirror means for additive assembly thereat of the projected image outputs of said primary and secondary projecting sections; and in which is inserted in each of the light source sub-assemblies of the projecting sections, between the source of light rays and condenser thereof, a swingable dichroic filter, whereby change of the angle of incidence with respect to the optical path of at least one of the dichroic filters by swing thereof the light outputs of the two light ray sources can be color corrected for identicalness.

10. The projection optical printer of claim 9 in which operator-controlled drive mechanism is provided for translating at will in correlated manner said printing lens and camera gate along the optical axis thereof; and there is also provided operator-controlled means for translating said imaging transfer lens assembly in each of said projecting sections independently along the optical axis relative to said common means which supports said light source sub-assembly and said aerial image projector in this projecting section, and also relative to said camera gate and printing lens; whereby in each of said projecting sections adjustment of the position of said imaging transfer lens assembly thereof along the optical axis will maintain in focus at the gate of said master projector thereof any image borne by the film translated through said aerial image projector gate thereof.

11. The projection optical printer of claim 2 in which is provided position control means operatively connected to said axially translatable printing lens and camera gate and to said means for moving said light valve vanes simultaneously toward and away from each other, said position control means being adapted to provide said light valve vane moving means with a control input proportional to printing lens and camera gate axial translation.

12. The projection optical printer of claim 11 wherein said position control means comprises printing lens and camera gate translation apparatus for effecting said translation along the optical axis, a first signal generator operatively connected thereto and producing an output signal proportional to optical axis translation of said printing lens and camera gate, a second signal generator operatively connected to said light valve vane moving means and producing an output signal proportional to the simultaneous movement of said vanes, circuit means connected to said signal generators and combining said output signals to produce a circuit output signal and means responding to the circuit output signal for generating said control input to said light valve vane moving means.

13. The projection optical printer of claim 12 wherein said circuit means comprises a network which subtractively combines said second signal generator output signal with said first signal generator output signal to produce said circuit output signal.

14. The projection optical printer of claim 12 in which is further provided a manual controller for said circuit output signal, said position control means including also a third signal generator operatively connected to said manual controller and producing an output signal proportional to the controller setting, said circuit means being connected also to said third signal generator for combining all signal generator output signals to produce said circuit output signal.

15. The projection optical printer or claim 12 wherein said means responding to said circuit output signal comprises an electric motor and a mechanism driven thereby to provide said control input, said motor driven mechanism including first and second output members coupled respectively to said light valve vane moving means and said second signal generator.

16. The projection optical printer claimed in claim 15 wherein said light valve vane moving means comprises a driven rotary cam having a contoured track coupled to said first output member for drive thereby, follower means urged to continuous contact with said track, and means connecting said follower means to said movable light valve vanes, said cam being rotated by said first output shaft in a manner which rotatably translates said track with the advancing point of contact thereof of said follower means progressing linearly in radial degrees whereby said movable light valve vanes are advanced and retracted linearly relative to each other.

17. The projection optical printer of claim 12 wherein the optical system includes an additional projector head to serve as an aerial image projector interposed between said light valve and the first-mentioned projector head with the latter serving as a master projector, and an imaging transfer lens assembly interposed between said aerial image and master projector heads, said position control means including further imaging transfer lens translation apparatus and another signal generator operatively connected thereto and producing an output signal proportional to transfer lens translation along the optical axis, said circuit means being connected also to said last-mentioned signal generator for combining all signal generator output signals to produce said circuit output signal.

18. The projection optical printer of claim 9 in which is provided, in association with said printing lens and camera gate, translation apparatus operatively connected thereto to effect axial translation thereof, a first signal generator operatively connected to said axial translation apparatus for producing an output signal proportional to the axial translation of said printing lens and camera gate; position control means adapted to provide said light valve moving means of said primary projecting section with a control input proportional to printing lens and camera gate axial translation, a second signal generator operatively connected to said light valve vane moving means for producing a second output signal proportional to the simultaneous movement of said vanes; additional translation apparatus operatively connected to said imaging transfer lens located in said primary projecting section to effect axial translation of this imaging lens, a third signal generator operatively connected to said imaging transfer lens translation apparatus for producing a third output signal proportional to the axial translation of this imaging lens; a manual controller for said primary projecting section, a fourth signal generator operatively connected to said manual controller for producing a fourth output signal proportional to the controller setting; circuit means connected to said signal generators and combining said output signals to produce a summed circuit output signal for generating said control input to said light valve moving means; and functionally similar light valve vane control means, imaging transfer lens translation apparatus and manual controller respectively having operatively connected thereto functionally similar second, third and fourth signal generators associated with said secondary projecting section, an additional secondary projecting section first signal generator operatively connected to said printing lens and camera gate translation apparatus for producing another first output signal that is proportional to the axial translation of said printing lens and camera gate, and second circuit means connected to said secondary projecting section first, second, third and fourth signal generators and combining said output signals of these four signal generators to produce a summed circuit output signal for generating the control input to the light valve moving means embodied in said secondary projecting section.

* * * * *

UNITED STATES PATENT OFFICE
CERTIFICATE OF CORRECTION

Patent No. 3,682,540                    Dated August 8, 1972

Inventor(s) John W. Oxberry, Werner K. Bender, Stanislaw A. Policht

It is certified that error appears in the above-identified patent and that said Letters Patent are hereby corrected as shown below:

Column 2, line 56, for "lens" read --lens assembly, which involves the problem of image size change remarked above. Since the focal length of the printing lens--; column 3, line 41, for "and redder is the" read --the redder is the produced beam. This is unacceptable in full color--; line 43, for "through" read --though--; column 5, line 11, for "passes" read --passed--; line 65, for "1:3" read --1:3,--; column 7, line 4, for "secton" read --section--; line 30, for "spacing" read --spacings--; column 8, line 2, for "one-eight" read --one-eighth--; column 10, line 58, for "also provided" read --also preferably provided--; column 19, line 36, for "jects's" read --ject's--;

line 4, for "system" read --systems--; column 25, line 40, after "adjusting" insert --the light passing space or slot 438 thereintervening. In--; line 46, for "are" read --and--; column 26, line 13, for "it" read --its--; line 16, for "identical" read --identified--; column 27, line 6, for "212" read --121--; line 8, after "20," delete the comma (,) --20--; column 29, line 16, for "It is is" read --If it is--;
line 60, for "440'" read --400'--; column 30, line 46, for "improve" read --improved--; column 31, line 34, for "broke" read --broken--; column 33, line 34, for "and", second occurrence, read --said--; column 34, line 12, for "an" read --and--.

Signed and sealed this 20th day of March 1973.

(SEAL)
Attest:

EDWARD M. FLETCHER, JR.
Attesting Officer

ROBERT GOTTSCHALK
Commissioner of Patents